US 10,787,235 B2

(12) United States Patent
Lelaurin et al.

(10) Patent No.: US 10,787,235 B2
(45) Date of Patent: *Sep. 29, 2020

(54) METHODS AND UNDERWATER BASES FOR USING AUTONOMOUS UNDERWATER VEHICLES FOR MARINE SEISMIC SURVEYS

(71) Applicant: Seabed Geosolutions B.V., Leidschendam (NL)

(72) Inventors: Antoine Lelaurin, Massy (FR); Jonathan Grimsdale, Massy (FR); Thierry Brizard, Massy (FR)

(73) Assignee: Seabed Geosolutions B.V., Houston, TX (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/837,629

(22) Filed: Dec. 11, 2017

(65) Prior Publication Data

US 2018/0105239 A1 Apr. 19, 2018

Related U.S. Application Data

(63) Continuation of application No. 14/777,395, filed as application No. PCT/EP2014/055576 on Mar. 20, 2014, now Pat. No. 9,845,137.

(Continued)

(51) Int. Cl.
*B63G 8/00* (2006.01)
*B63B 27/16* (2006.01)
*G01V 1/38* (2006.01)

(52) U.S. Cl.
CPC .............. *B63G 8/001* (2013.01); *B63B 27/16* (2013.01); *G01V 1/3852* (2013.01);
(Continued)

(58) Field of Classification Search
CPC .............. B63G 8/001; B63G 2008/008; B63G 2008/004; G01V 1/3852; B63B 27/16; B63B 2027/165
(Continued)

(56) References Cited

U.S. PATENT DOCUMENTS

| 3,918,379 A | 11/1975 | McNary |
| 5,253,605 A | 10/1993 | Collins |

(Continued)

FOREIGN PATENT DOCUMENTS

| GB | 2041301 A | 9/1980 |
| GB | 2163114 A | 2/1986 |

(Continued)

OTHER PUBLICATIONS

Cranford, A Direct-Recording Ocean-Bottom Seismograph, Bulletin of the Seismological Society of America, vol. 66, No. 2, 607-615 (Apr. 1976) ("Cranford").

(Continued)

*Primary Examiner* — Daniel L Murphy
(74) *Attorney, Agent, or Firm* — Shane Nelson

(57) ABSTRACT

A method for cycling autonomous underwater vehicles (AUVs) that record seismic signals during a marine seismic survey. The method includes deploying plural current AUVs on the ocean bottom; recording the seismic signals during the marine seismic survey with plural current AUVs; releasing from an underwater base a new AUV to replace a corresponding current AUV from the plural current AUVs; recovering the current AUV; and continuing to record the seismic signals with the new AUV.

20 Claims, 18 Drawing Sheets

Related U.S. Application Data

(60) Provisional application No. 61/803,617, filed on Mar. 20, 2013.

(52) U.S. Cl.
CPC .. *B63B 2027/165* (2013.01); *B63G 2008/004* (2013.01); *B63G 2008/008* (2013.01)

(58) Field of Classification Search
USPC .......................................................... 367/15
See application file for complete search history.

(56) References Cited

U.S. PATENT DOCUMENTS

| | | | |
|---|---|---|---|
| 5,390,012 | A | 2/1995 | Miyashiro et al. |
| 5,758,592 | A | 6/1998 | Benson |
| 5,894,450 | A | 4/1999 | Schmidt et al. |
| 6,474,254 | B1 | 11/2002 | Ambs et al. |
| 6,482,054 | B2 | 11/2002 | Treaster et al. |
| 6,625,083 | B2 | 9/2003 | Vandenbrouke |
| 6,779,475 | B1 | 8/2004 | Crane et al. |
| 6,932,185 | B2 | 8/2005 | Bary et al. |
| 6,951,138 | B1 | 10/2005 | Jones |
| 7,016,260 | B2 | 3/2006 | Bary |
| 7,124,698 | B1 | 10/2006 | Shen et al. |
| 7,148,416 | B1 | 12/2006 | Rice |
| 7,252,046 | B1 | 8/2007 | Ead et al. |
| 7,796,466 | B2 | 9/2010 | Combee et al. |
| 7,965,583 | B2 | 6/2011 | Thomas |
| 8,025,021 | B2 | 9/2011 | Gosling |
| 8,096,254 | B1 | 1/2012 | Bauer et al. |
| 8,109,223 | B2 | 2/2012 | Jamieson |
| 8,576,658 | B2 | 11/2013 | Thomas |
| 8,677,921 | B2 | 3/2014 | Gosling |
| 8,717,844 | B2 | 5/2014 | Welker et al. |
| 9,090,319 | B2 | 7/2015 | Brizard et al. |
| 9,829,589 | B2 | 11/2017 | Ray et al. |
| 10,017,232 | B2 * | 7/2018 | Lelaurin ................ B65D 88/78 |
| 2006/0054074 | A1 | 3/2006 | Wingett et al. |
| 2010/0000459 | A1 | 1/2010 | Colangelo |
| 2010/0157727 | A1 | 6/2010 | Woodard, Jr. et al. |
| 2010/0182870 | A1 | 7/2010 | Norris et al. |
| 2010/0302901 | A1 | 12/2010 | Welker et al. |
| 2011/0266086 | A1 | 11/2011 | Welker |
| 2011/0297121 | A1 | 12/2011 | Kraus et al. |
| 2012/0057430 | A1 | 3/2012 | Roquette et al. |
| 2012/0069702 | A1 | 3/2012 | Muyzert et al. |
| 2013/0083624 | A1 | 4/2013 | Brizard et al. |
| 2014/0177387 | A1 | 6/2014 | Brizard et al. |
| 2014/0301161 | A1 | 10/2014 | Brizard et al. |
| 2015/0316675 | A1 | 11/2015 | Brizard et al. |

FOREIGN PATENT DOCUMENTS

| | | |
|---|---|---|
| JP | 03266794 | 11/1991 |
| WO | 2001073477 A2 | 10/2001 |
| WO | 2011106237 A2 | 9/2011 |
| WO | 2012013171 A1 | 2/2012 |
| WO | 2012013962 A1 | 2/2012 |
| WO | 2012085590 A2 | 6/2012 |
| WO | 2013041838 A2 | 3/2013 |
| WO | 2013045669 A1 | 4/2013 |
| WO | 2013076488 A1 | 5/2013 |
| WO | 2013128187 A1 | 6/2013 |
| WO | 2013128188 A1 | 6/2013 |

OTHER PUBLICATIONS

Mattaboni, MITOBs: A Seismometer System for Ocean-Bottom Earthquake Studies, Marine Geophysical Researches 3 (1977), pp. 87-102 ("Mattaboni").
http://www.carrack.co.uk/minidobs.htm ("Carrack"), Carrack Measurement Technology, downloaded Jun. 20, 2017.
Willoughby, A Microprocessor-Based Ocean-Bottom Seismometer, Bulletin of the Seismological Society of America, vol. 83, No. 1., 190-217 (Feb. 1993) ("Willoughby").
Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").
Johnson, A Free-Fall Direct-Recording Ocean Bottom Seismograph, Marine Geophysical Researches 3 103-117 (1977) ("Johnson").
Sutton, Optimum Design of Ocean Bottom Seismometers, Marine Geophysical Researches 9 (1987), pp. 47-65 ("Sutton").
Schmalfeldt, Explosion-Generated Seismic Interface Waves in Shallow Water: Experimental Results, SACLANTCEN Report SR-71 (1983) ("Schmalfeldt").
Eguchi, A real-time observation network of ocean-bottom-seismometers deployed at the Sagami trough subduction zone, central Japan, Marine Geophysical Researches 20: 73-94, 1998 ("Eguchi").
Kirk, A Three-Component Ocean Bottom Seismograph for controlled Source and Earthquake Seismology, Marine Geophysical Researches 5, 1982, 327-341 ("Kirk").
Petition for Inter Partes Review of U.S. Pat. No. Re. 45,268, dated Apr. 27, 2018.
Petition for Inter Partes Review of U.S. Pat. No. 8,879,362, dated Apr. 27, 2018.
Petition for Inter Partes Review of U.S. Pat. No. 8,228,761, dated Apr. 27, 2018.
Patent Cooperation Treaty: PCT/EP2012/069144 International Search Report, dated Feb. 4, 2013.
Patent Cooperation Treaty: PCT/EP2012/069144 Written Opinion, dated Feb. 4, 2013.
Patent Cooperation Treaty: PCT/EP2012/069145 International Search Report, dated Feb. 6, 2013.
Patent Cooperation Treaty: PCT/EP2012/069145 Written Opinion, dated Feb. 6, 2013.
European Patent Office: PCT/EP2014/055576 International Search Report, dated May 9, 2014.
Brighenti et al; "Eurodocker—A Universal Docking—Downloading—Recharging Systems for AUVs: Conceptual Design Results", Oceans '98 Conference Proceedings, Nice, France Sep. 28-Oct. 1, 1988, New York, NY USA IEEE U.S. vol. 3, Sep. 28, 1998, pp. 1463-1467.
Ducey, Rhonda; "Flying Nodes Shift Marine Seismic Paradigm", http://epmag.com/item/print/Flying-Nodes-Shift-Marine-Seismic-Paradigm 92689, Feb. 28, 2012.
Hyakudome, Tadahiro; "Design of Autonomous Underwater Vehicle", Japan Agency for Marine-Earth Science and Technology (JAMSTEC), Japan, International Journal of Advanced Robotic Systems; vol. 8, No. 1 (2011) ISSN 1729-8806; pp. 122-130.
Rajala et al.; "Vehicle Replacement in AUV Formations" Proceedings of the 14th International Symposium of Unmanned Untethered Submersible Technology, Aug. 21, 2005, pp. 1-9.
Rajala et al.; "AUVish: An Application-Based Language for Cooperating AUVs", Oceans 2006, IEEE, PI, Sep. 1, 2006, pp. 1-6.
Singh et al.; "An Intelligent Dock for an Autonomous Ocean Sampling Network", Oceans 98 Conference Proceedings, Nice, France, Sep. 28-Oct. 1, 1998, New York, NY USA, IEEE, US vol. 3, Sep. 28, 1998, pp. 1459-1462.
Stokey et al.; "A Docking System for REMUS, an Autonomous Underwater Vehicle", IEEE, 1997, available from ieeexplore.ieee.org/iel13/4919/13571.pdf, 5 pages.
Yoerger et al.; Fine-Scale Seafloor Survey in Rugged Deep-Ocean Terrain with an Autonomous Robot:, Proceedings, ICRA, International Conference on Robotics and Automation, San Francisco, CA Apr. 2000, ISBN: 0-7803-5886-4 pp. 1787-1792.
Yoshida et al.; "New Attempts in the MR-X1 Sea-Trials—The Working AUV Tries to Survey of the Sea Floor and to Take Mud Samples" Paper No. OMAE2010-20347; Proceedings of the ASME 2010 29th International Conference on Ocean, Offshore and Arctic Engineering, Jun. 6-11, 2010, Shanghai, China downloaded from http://proceedings.asmedigitalcollection.asme.org/ on Nov. 25, 2015.

* cited by examiner

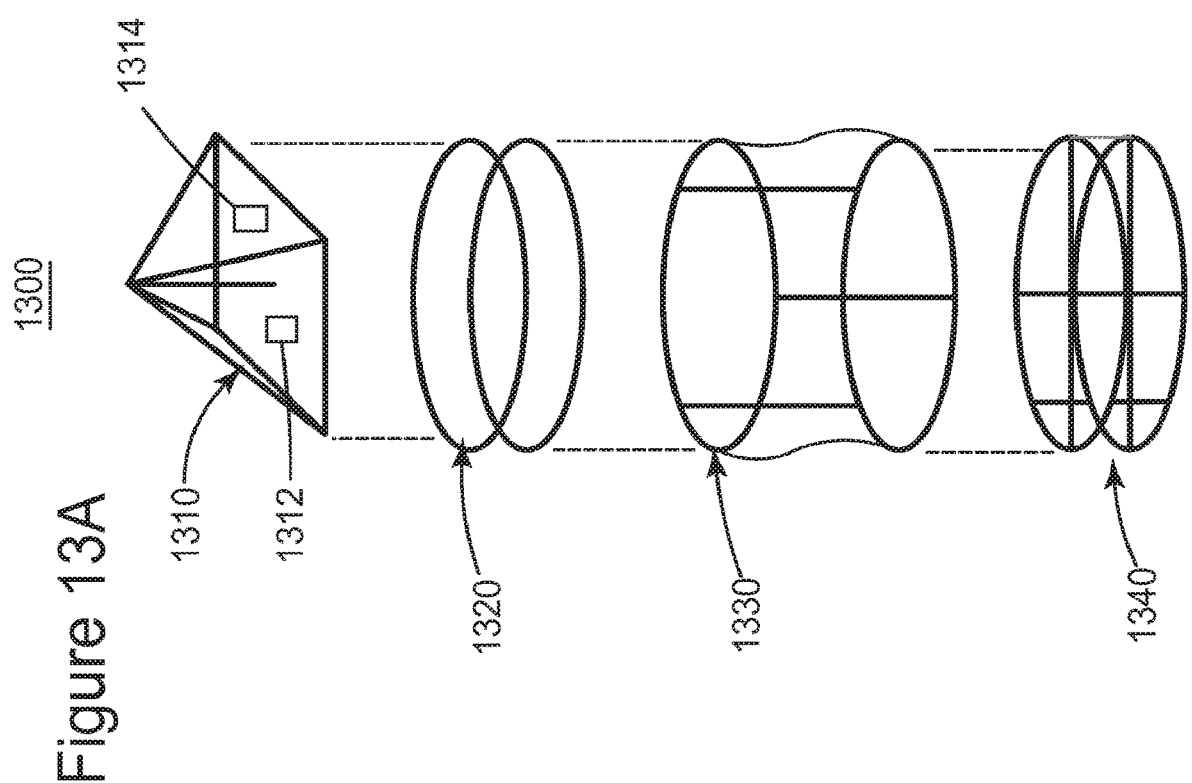
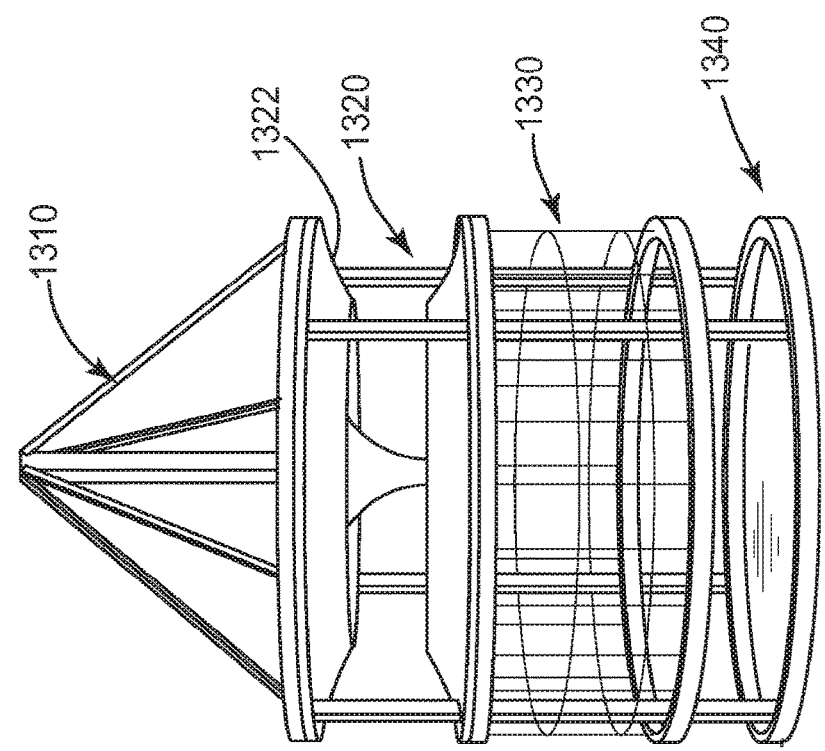

METHODS AND UNDERWATER BASES FOR USING AUTONOMOUS UNDERWATER VEHICLES FOR MARINE SEISMIC SURVEYS

PRIORITY

The present application is a continuation of U.S. application Ser. No. 14/777,395, filed on Sep. 15, 2015, which is a national stage entry of application PCT/EP2014/055576, filed on Mar. 20, 2014, which claims priority to U.S. provisional patent application No. 61/803,617, filed on Mar. 20, 2013. The entire contents of each of the above documents is incorporated herein by reference.

BACKGROUND

Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors.

Discussion of the Background

Marine seismic data acquisition and processing generate a profile (image) of a geophysical structure beneath the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which is especially helpful in the oil and gas industry. Marine reflection seismology uses a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating seismic waves and recording their reflections off the geological structures present in the subsurface is illustrated in FIG. 1. A vessel 100 tows an array of seismic receivers 110 provided on streamers 112. Streamers may be disposed horizontally, i.e., lying at a constant depth relative to the ocean surface 114. The streamers may have spatial arrangements other than horizontal. Vessel 100 also tows a seismic source array 116 configured to generate a seismic wave 118. Seismic wave 118 propagates downward and penetrates the seafloor 120 until a reflecting structure 122 (reflector) eventually reflects the seismic wave. Reflected seismic wave 124 propagates upward until it is detected by the receiver(s) 110 on streamer(s) 112. Based on the data collected by receiver(s) 110, an image of the subsurface is generated by further analyses of the collected data. Seismic source array 116 includes plural individual source elements, which may be distributed in various patterns, e.g., circular, linear, at various depths in the water.

However, this traditional configuration is expensive because the cost of streamers is high. New technologies deploy plural seismic sensors on the bottom of the ocean (ocean bottom stations) to improve the coupling. Even so, positioning seismic sensors remains a challenge.

Newer technologies use autonomous underwater vehicles (AUVs) that have a propulsion system and are programmed to move to desired positions and record seismic data. After recording the seismic data, the AUVs are instructed to return to a vessel or underwater base to recharge their batteries and/or transfer the seismic data. Various methods have been proposed for deploying and collecting the AUVs. However, none of the existing methods fully address the needs of a seismic survey that uses AUVs which land on the ocean bottom to collect the seismic data.

Accordingly, it would be desirable to provide systems and methods that provide an inexpensive and efficient method for deploying AUVs on the ocean bottom, to record seismic waves, and resurface after recording the data.

SUMMARY

According to one embodiment, there is a method for cycling autonomous underwater vehicles that record seismic signals during a marine seismic survey. The method includes deploying plural current AUVs on the ocean bottom; recording the seismic signals during the marine seismic survey with plural current AUVs; releasing from an underwater base a new AUV to replace a corresponding current AUV from the plural current AUVs; recovering the current AUV; and continuing to record the seismic signals with the new AUV.

According to another embodiment, there is a method for cycling autonomous underwater vehicles that record seismic signals during a marine seismic survey. The method includes recording the seismic signals during the marine seismic survey with plural current AUVs deployed on the ocean bottom; replacing during the seismic survey a current AUV from the plural current AUVs with a new AUV; and continuing to record the seismic signals with the new AUV.

According to yet another embodiment, there is a method of rolling autonomous underwater vehicles that record seismic signals during a marine seismic survey. The method includes recording the seismic signals during the marine seismic survey with plural AUVs deployed on the ocean bottom; instructing an AUV from the plural AUVs, after recording the seismic signals, to move to a new location to be surveyed; and continuing to record the seismic signals with the AUV at the new location during the same marine seismic survey.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 13A and 13B are schematic diagrams of a recovery base according to an embodiment;

DETAILED DESCRIPTION

Figure 1:
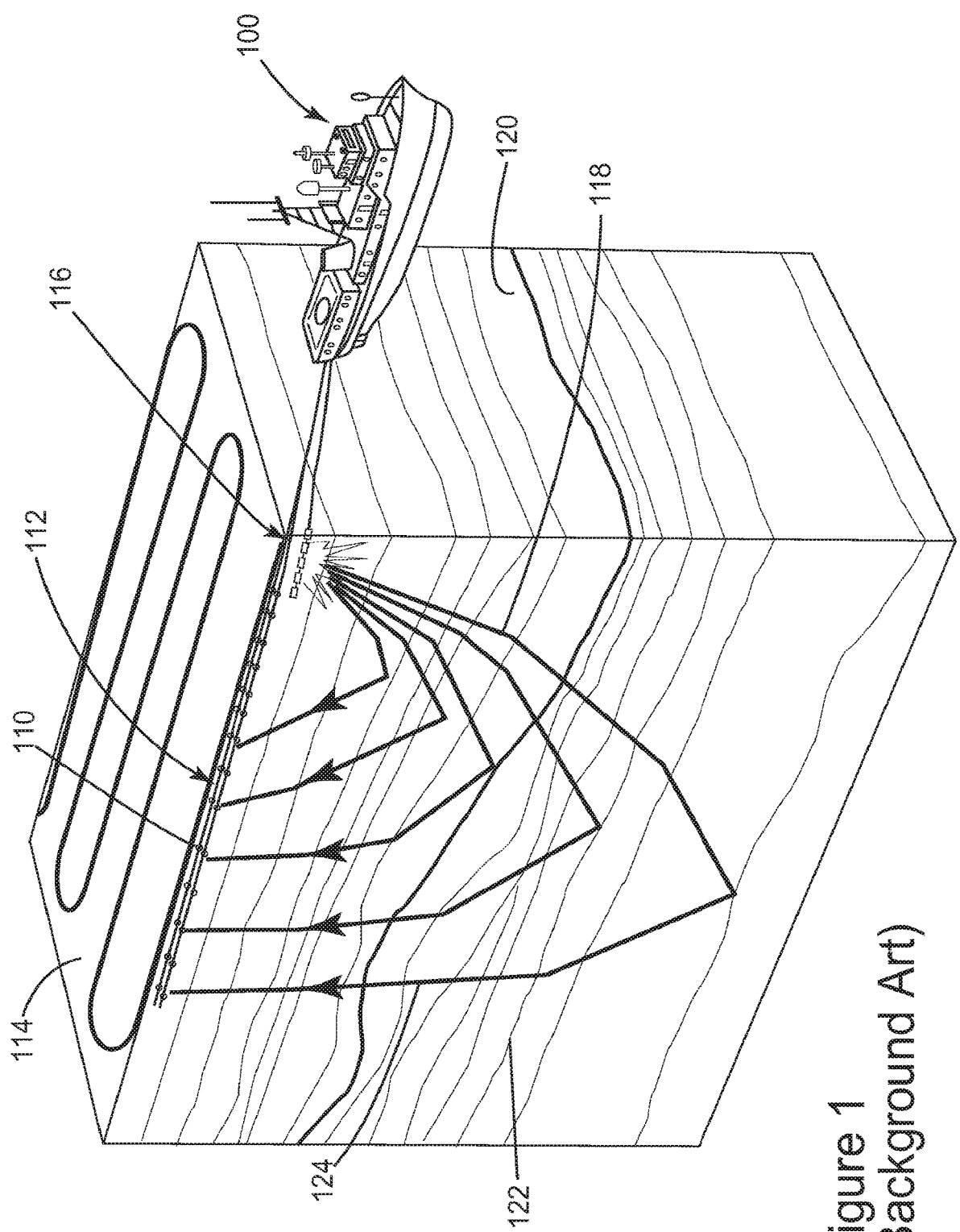
FIG. 1 is a schematic diagram of a conventional seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV with seismic sensors for recording seismic waves. Note that an AUV in the following description is considered to encompass an autonomous self-propelled node that has one or more sensors capable of detecting seismic waves.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Emerging technologies in marine seismic surveys need an inexpensive system for deploying and recovering seismic receivers that are configured to operate underwater. According to an exemplary embodiment, such a seismic system includes plural AUVs, each having one or more seismic sensors. The seismic sensors may include a hydrophone, geophone, accelerometer, electromagnetic sensor, depth sensor, or a combination thereof.

The AUV may be inexpensively and efficiently designed, e.g., using internal components available off the shelf. A deployment vessel or underwater base stores the AUVs and launches them as necessary for the seismic survey. The underwater base may be a buoy, a structure deployed on the ocean bottom that has means for communicating with the vessel, a structure floating in water, etc. The AUVs find their desired positions using, for example, an inertial navigation system. However, in another application, the AUVs find their desired positions using a combination of acoustic guidance, waypoint navigation and information from various navigation sensors such as an inertial measurement unit, echo sounder, pressure gauge, etc. Other systems or methods may be used for finding their desired positions. Thus, the AUVs may be preprogrammed or partially programmed to find their desired positions. If the AUVs are partially programmed, the final details for finding the desired position may be received, acoustically, from the vessel or the underwater base when the AUV is launched from the vessel.

As the deployment vessel or underwater base is launching the AUVs, a shooting vessel for generating seismic waves may be used to generate seismic waves. The shooting vessel may tow one or more seismic source arrays, each one including plural source elements. A source element may be an impulsive element, e.g., a gun, or a vibratory element. The shooting vessel or another vessel, e.g., the recovering vessel, the deployment vessel, or the underwater base, may then instruct selected AUVs to return to the underwater base or to resurface so they can be collected. In one embodiment, the deployment vessel also tows and shoots source arrays as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake up the AUVs and instruct them to return to the surface for recovery.

In one exemplary embodiment, the number of AUVs is in the thousands. Thus, the deployment vessel is configured to hold all of them at the beginning of the seismic survey and then to launch them as the survey advances. Alternatively, a set of underwater bases is used to handle all the AUVs.

In an embodiment, the seismic survey is performed with a combination of seismic sensors on the AUVs and seismic sensors on streamers towed by the deployment vessel, the shooting vessel, or both of them.

In still another embodiment, when selected AUVs are instructed to leave their recording locations, they may be programmed to go to a desired rendezvous point where they will be collected by the shooting vessel, the deployment vessel, the recovery vessel, or the underwater base. The selected AUVs may be chosen from a given row or column if that type of arrangement is used. The shooting, deployment, recovery vessel, or the underwater base may be configured to send acoustic signals to the returning AUVs to guide them to the desired position.

Once on the vessel or the underwater base, the AUVs are checked for problems, their batteries may be recharged, and the stored seismic data may be transferred to the vessel for processing. After this maintenance phase, the AUVs are again deployed as the seismic survey continues. Thus, in one exemplary embodiment, the AUVs are continuously deployed and retrieved.

Figure 2:
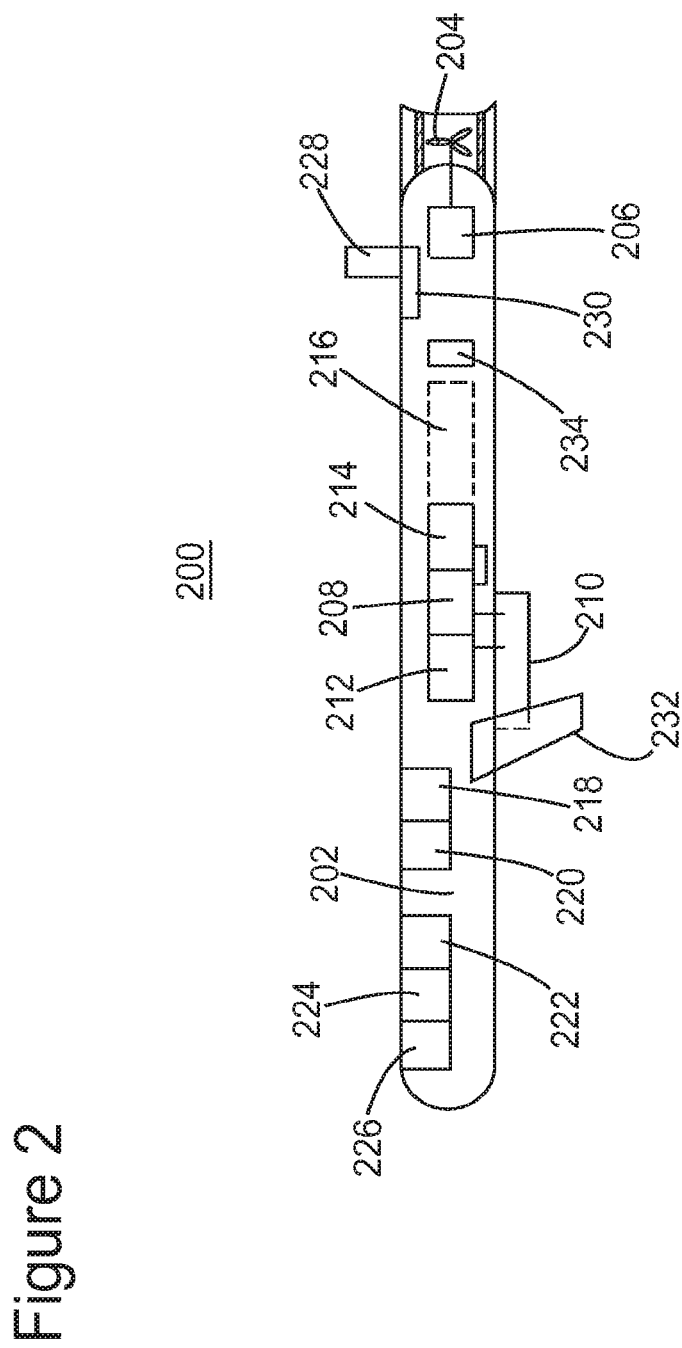
FIG. 2 is a schematic diagram of an AUV.

The above-noted embodiments are now discussed in more detail with regard to the figures. FIG. 2 illustrates an AUV 200 having a body 202 to which one or more propellers 204 are attached. A motor 206 inside the body 202 activates propeller 204. Other propulsion systems may be used, e.g., jets, thrusters, pumps, etc. Motor 206 may be controlled by a processor 208. Processor 208 may also be connected to a seismic sensor 210. Seismic sensor 210 may be shaped so that when the AUV lands on the seabed, the seismic sensor achieves a good coupling (e.g., direct) with the seabed sediments. The seismic sensor may include one or more of a hydrophone, geophone, accelerometer, etc. For example, if a 4C (four component) survey is desired, the seismic sensor 210 includes three accelerometers and a hydrophone, i.e., a total of four sensors. Alternatively, the seismic sensor may include three geophones and a hydrophone. Of course, other sensor combinations are possible.

A memory unit 212 may be connected to processor 208 and/or seismic sensor 210 for storing a seismic sensor's 210 recorded data. A battery 214 may be used to power all these components. Battery 214 may be allowed to change its position along a track 216 to alter the AUV's center of gravity.

The AUV may also include an inertial navigation system (INS) 218 configured to guide the AUV to a desired location. An inertial navigation system includes at least one module containing accelerometers, gyroscopes, magnetometers or other motion-sensing devices. The INS is initially provided with the position and velocity of the AUV from another source, for example, a human operator, a global positioning system (GPS) satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation, or velocity once it has been initialized. As noted above, alternative systems may be used, as, for example, acoustic positioning.

Besides, or instead of, the INS 218, the AUV 200 may include a compass 220 and other sensors 222 such as, for example, an altimeter for measuring its altitude, a pressure gauge, an interrogator module, etc. The AUV may optionally include an obstacle avoidance system 224 and a communication device 226 (e.g., Wi-Fi device, a device that uses an acoustic link) or another data transfer device capable of wirelessly transferring data. One or more of these elements may be linked to processor 208. The AUV further includes an antenna 228 (which may be flush with the body of the AUV) and a corresponding acoustic system 230 for communicating with the deploying, shooting, or recovery vessel or the underwater base. Stabilizing fins and/or wings 232 for guiding the AUV to the desired position may be used together with propeller 204 for steering the AUV. However, such fins may be omitted. The AUV may include a buoyancy system 234 for controlling the AUV's depth and keeping the AUV steady after landing.

Acoustic system 230 may be an Ultra-short baseline (USBL) system, sometimes known as a Super Short Base Line (SSBL). This system uses a method of underwater acoustic positioning. A complete USBL system includes a transceiver, which is mounted on a pole under a vessel, and a transponder/responder on the AUV. The processor is used to calculate a position from the ranges and bearings measured by the transceiver. For example, the transceiver transmits an acoustic pulse that is detected by the subsea transponder, which replies with its own acoustic pulse. This return pulse is detected by the transceiver on the vessel. The time from transmission of the initial acoustic pulse until the reply is detected is measured by the USBL system and is converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less. Alternatively, an SBL (short base line) system or an inverted short baseline (iSBL) system may be used.

Figure 3:
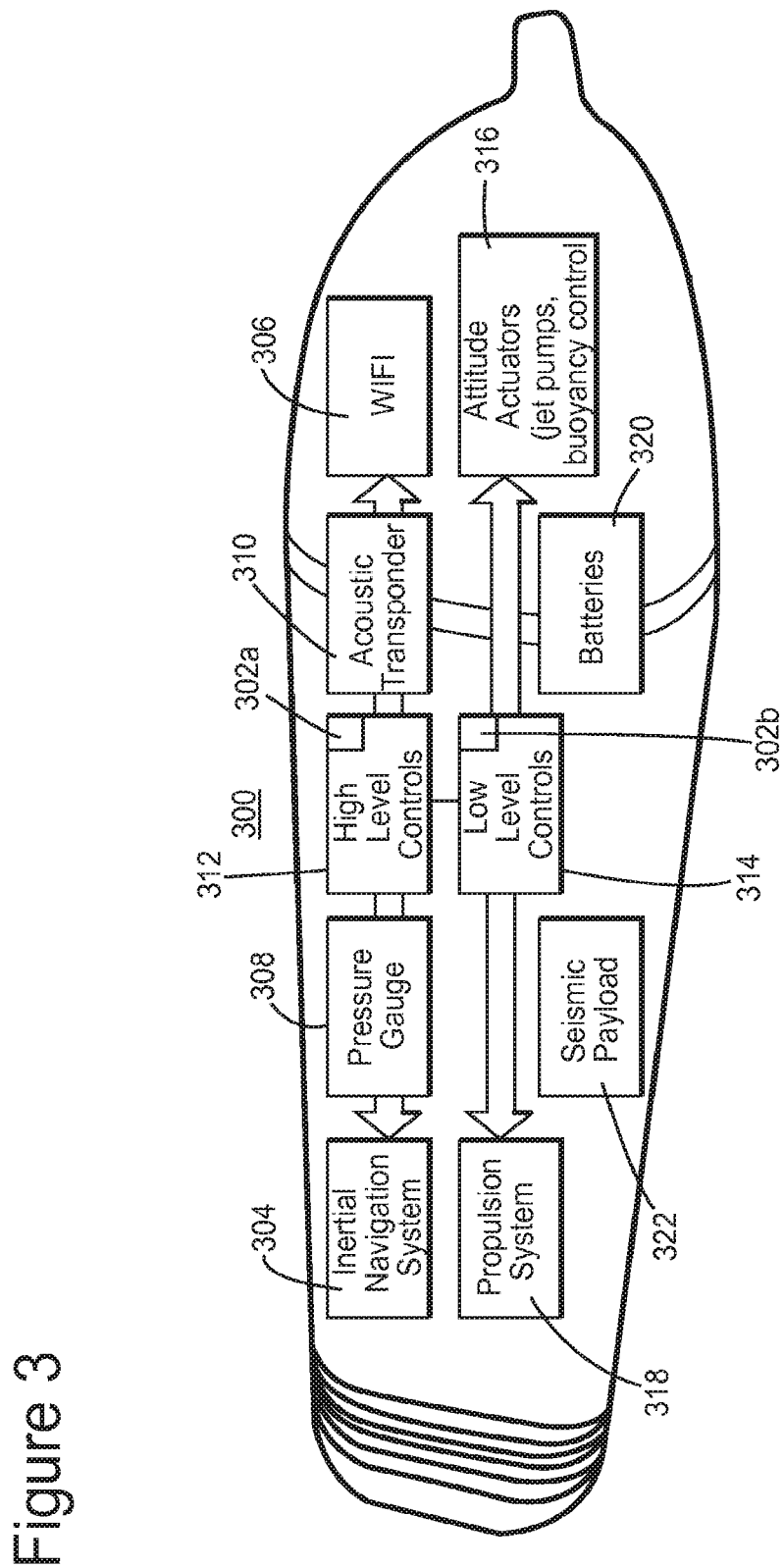
FIG. 3 is a high-level schematic diagram of an AUV.

With regard to the AUV's internal configuration, FIG. 3 schematically shows a possible arrangement for the internal components of an AUV 300. AUV 300 has a CPU 302a that is connected to INS 304 (or compass or altitude sensor and acoustic transmitter for receiving acoustic guidance from the mother vessel), wireless interface 306, pressure gauge 308, and transponder 310. CPU 302a may be located in a high-level control block 312. The INS is advantageous when the AUV's trajectory has been changed, for example, because of an encounter with an unexpected object, e.g., fish, debris, etc., because the INS is capable of taking the AUV to the desired final position as it does for currents, wave motion, etc. Also, the INS may have high precision. For example, it is expected that for a target having a depth of 300 m, the INS and/or the acoustic guidance is capable of steering the AUV within +/−5 m of the desired target location. However, the INS may be configured to receive data from the vessel to increase its accuracy.

An optional CPU 302b, in addition to the CPU 302a, is part of a low-level control module 314 configured to control attitude actuators 316 and propulsion system 318. The high-level control block 312 may communicate via a link with the low-level control module 314 as shown in the figure. One or more batteries 320 may be located in the AUV 300. A seismic payload 322 is located inside the AUV for recording the seismic signals. Those skilled in the art would appreciate that more modules may be added to the AUV. For example, if a seismic sensor is outside the AUV's body, a skirt may be provided around or next to the sensor. A water pump may pump water from the skirt to create a suction effect, achieving a good coupling between the sensor and the seabed. However, there are embodiments in which no coupling with the seabed is desired. For those embodiments, no skirt is used.

Figure 4:
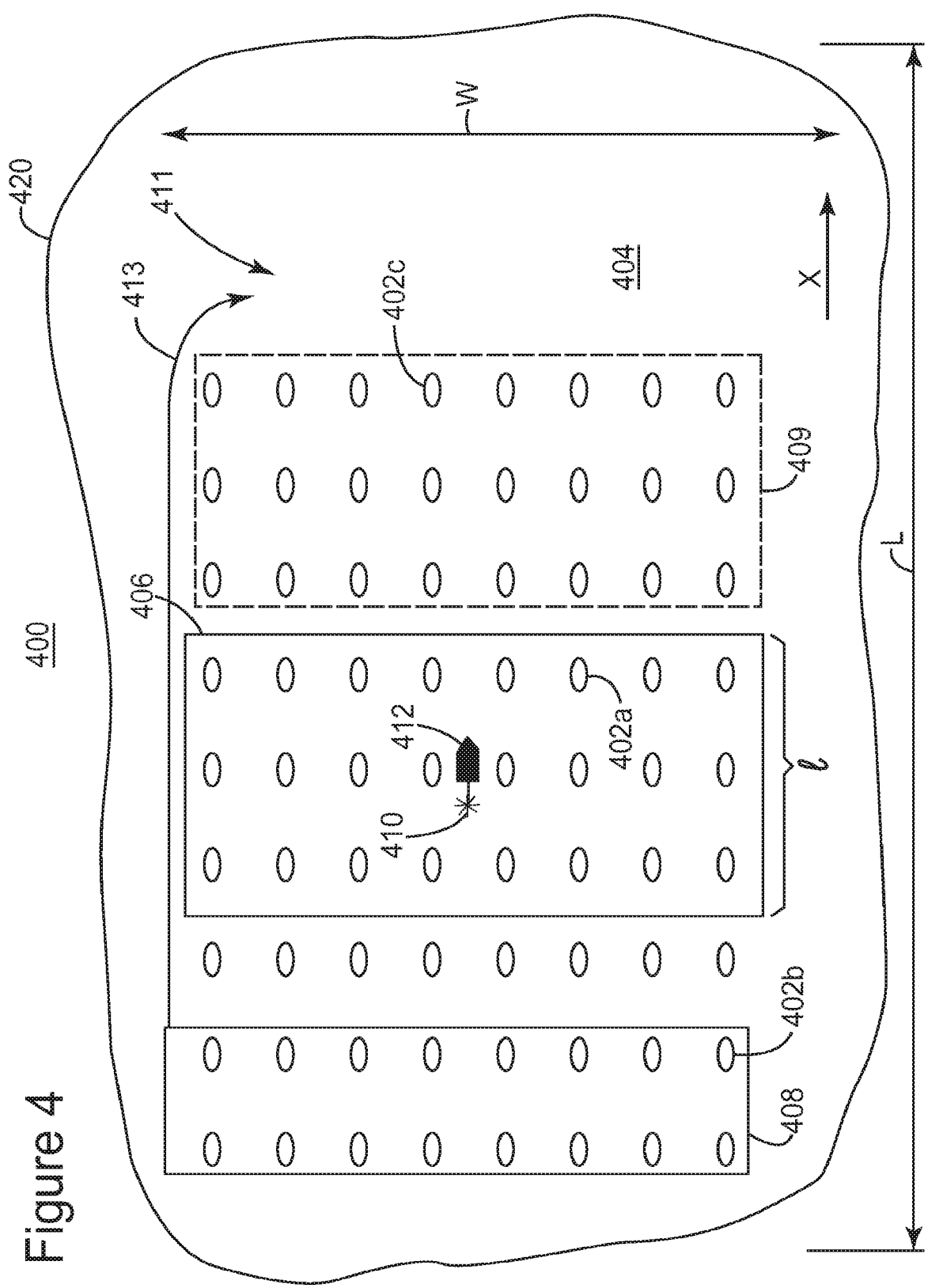
FIG. 4 is a schematic diagram of a rolling scheme for deploying AUVs during a seismic survey system.

FIG. 4 illustrates an embodiment in which a seismic survey system 400 includes plural AUVs 402a-c distributed across the ocean bottom 404. AUVs 402 are in direct contact with the ocean bottom 404 to achieve a better coupling between sensors of an AUV and the ocean bottom. AUVs 402a are inside an area 406, which constitutes the active recording area, while AUVs 402b and 402c are outside active recording area 406. AUVs 402b are inside an already recorded area 408, while AUVs 402c are distributed in an area 409 where they are going to become active and record seismic data. Seismic waves are generated by a seismic source 410 that is towed by a vessel 412. A seismic source may be towed by another device or it may be an autonomous source.

As an example, which is not intended to limit the applicability of the claims, it is possible that area 420, which is to be surveyed, has a length L of about 50 km and an width W of about 10 km while the active recording area 406 may have a length l of about 4 km and a width of about 2 km. Other numbers are possible depending on the conditions of the seismic survey.

As area 420 to be surveyed is too large to be simultaneously covered with AUVs, one approach for recording seismic data over the entire area, without having to fully cover it with AUVs, is to continuously roll a set of AUVs ahead of the seismic source. More specifically, consider that instead of simultaneously distributing AUVs over the entire area 420, AUVs are distributed only over areas 406, 408, and 409, which together may represent a percentage of the entire area 420. For example, it is possible that a total surface of areas 406, 408 and 409 constitutes 20% or less of the surface of area 420.

Thus, according to this embodiment, AUVs 402a are active inside the recording area 406, AUVs 402c are ready to record seismic data inside the future recording area 409 and AUVs 402b just finished recording the seismic data inside the recorded area 408. In order to have further AUVs ready for recording seismic data as vessel 412 advances along direction X, AUVs 402b of recorded area 408 are instructed to roll at new position 411 as indicated by arrow 413. Thus, the AUVs are rolled from one area to another area while the seismic waves are generated so that a limited number of AUVs can be used to cover the entire survey area 420. The details about moving the AUVs from one area to another area are discussed later.

Figure 5:
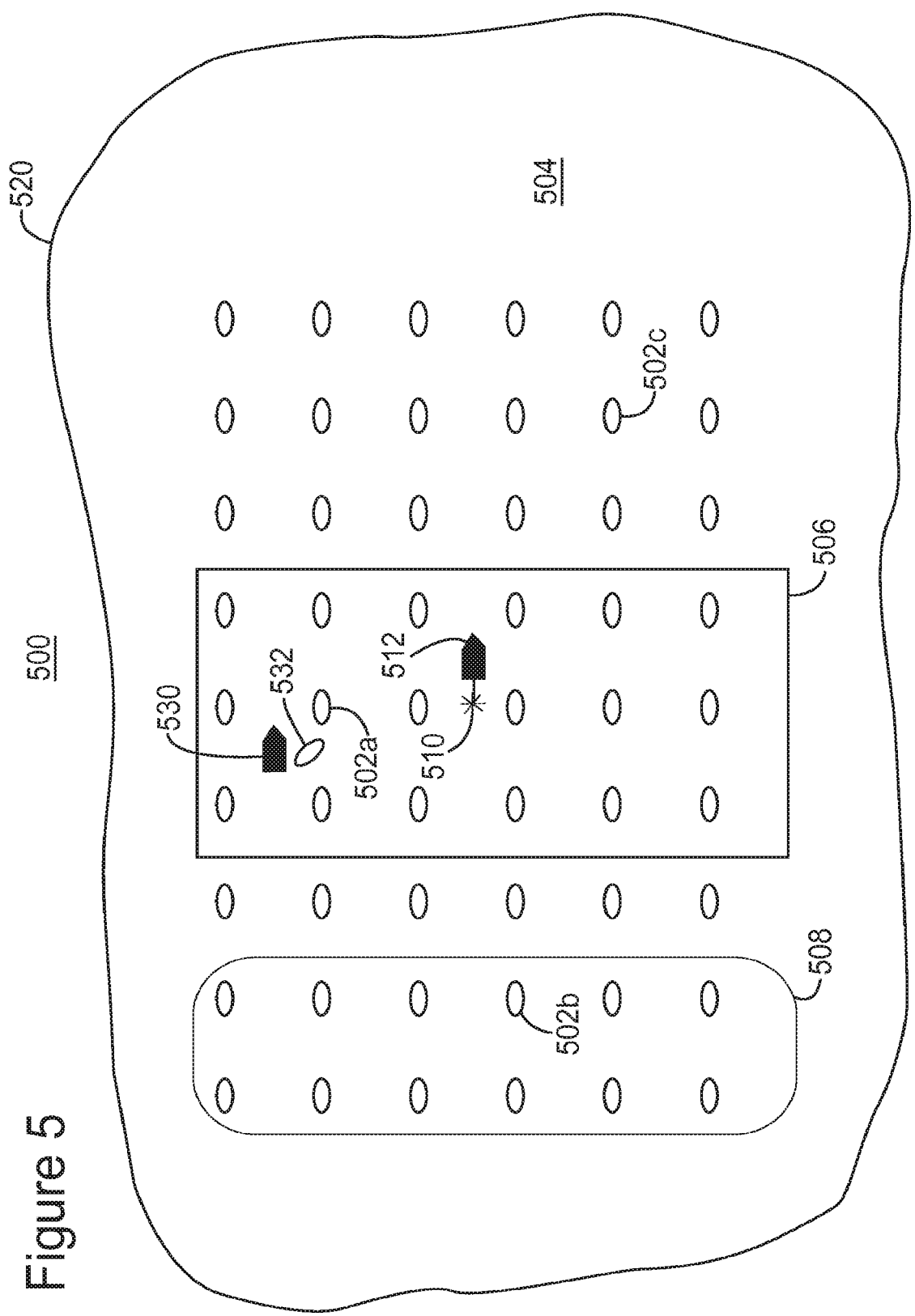
FIG. 5 is a schematic diagram of a cycling scheme for deploying AUVs during a seismic survey system according to an embodiment.

According to another embodiment illustrated in FIG. 5, instead of or in addition to using the rolling procedure discussed with regard to FIG. 4, it is possible to use a cycling procedure as now discussed. In other words, the cycling procedure may be an alternative or a complement to the rolling procedure. As illustrated in FIG. 5, a seismic survey system 500 includes a set of AUVs 502a distributed within a recording area 506, a set of AUVs 502b within an already recorded area 508 and a set of AUVs 502c to become active. All the AUVs are located on the ocean bottom and they may be actually attached to the ocean bottom with an appropriate device to obtain a better coupling. Vessel 512 tows seismic source 510 while another vessel 530 stores plural AUVs 532. If there is a need to replace AUV 502a before, during, or after the seismic source 510 has passed the actively recording area 506, AUV 532 may be deployed to replace AUV 502a. In one embodiment, a set of AUVs 532 is deployed at the same time to replace an entire set of AUVs 502a. This cycling of AUVs may happen while the set of AUVs 502a is actively recording seismic data. The set of AUVs 532 has recharged batteries and their memories may be empty while the set of AUVs 502a to be replaced may have drained batteries and full memories.

Figure 6:
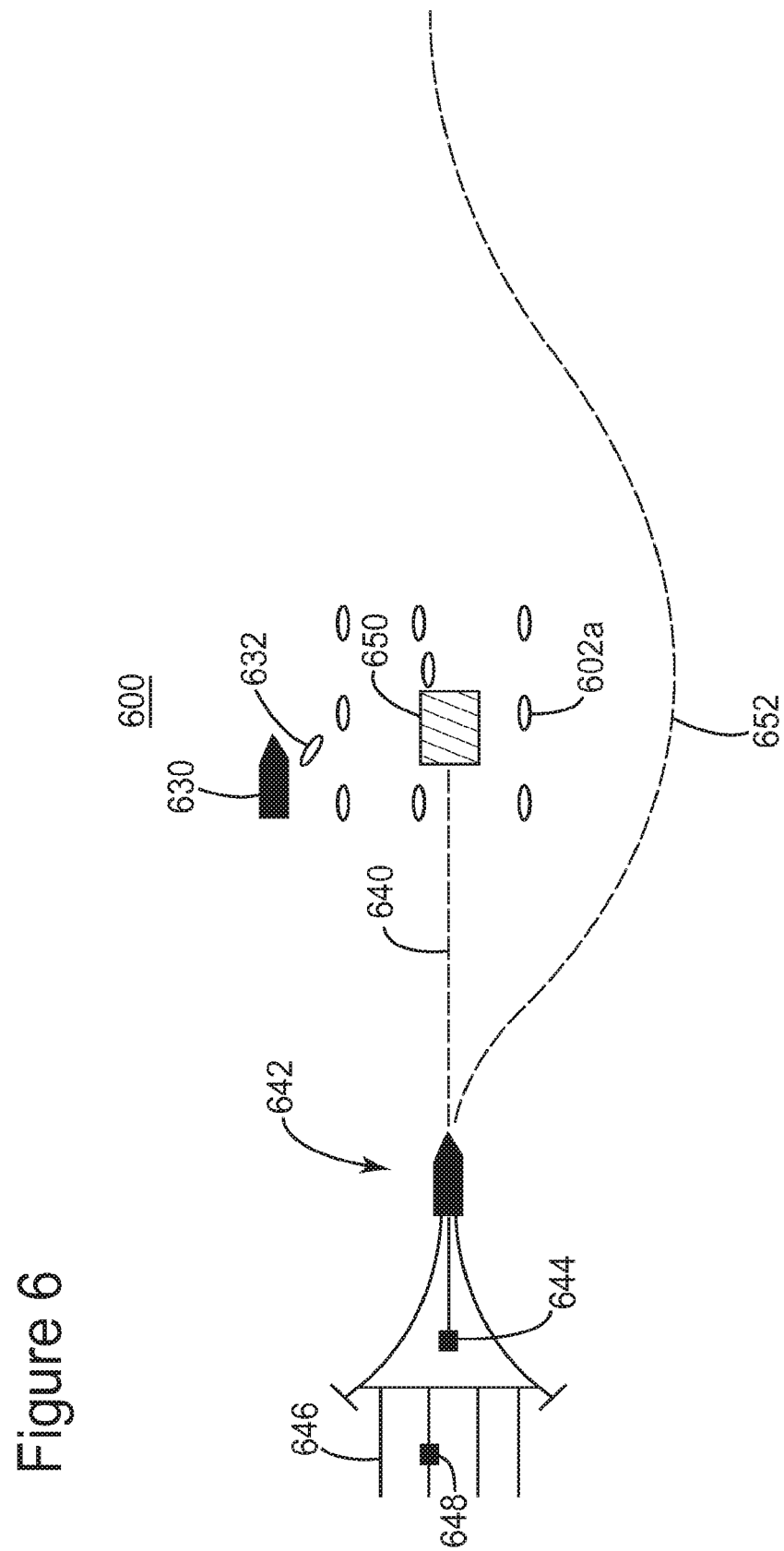
FIG. 6 is a schematic diagram of a seismic survey having streamers and AUVs according to an embodiment.

One reason for taking such an approach is now discussed. Consider, as illustrated in FIG. 6, that a traditional seismic survey 600 includes a vessel 642 that tows seismic source 644 and one or more streamers 646. Streamers 646 include seismic sensors 648 that record seismic waves generated by seismic source 644. However, while following its path 640, vessel 642 may encounter an obstacle 650, for example, a rig or platform, which needs to be avoided, or shallow waters where the vessel cannot go, etc. Thus, vessel 642 follows a modified path 652 that affects the seismic data to be recorded around obstacle 650. For this reason, AUVs 602a are deployed around obstacle 650 to produce in-fill seismic data that is missing from the seismic data recorded with streamers 646. In one application, AUVs 602a are deployed prior to vessel 642 arriving at obstacle 650. The time prior to this event may be in the order of hours if not days.

Thus, it is possible that by the time vessel 642 arrives near obstacle 650, one or more AUVs 602a will need to be replaced with new AUVs 632 that have a freshly charged battery and/or empty memory. Alternatively, it is possible that vessel 642 has passed AUVs 602a a first time, and when the same vessel passes AUVs 602a a second time, after the vessel has completed its line 640 and is coming back along an adjacent line, some AUVs 602s have already stayed for hours or days on the ocean bottom and are ready to be replaced by new AUVs. Thus, a predetermined condition for changing one AUV with another AUV may be related to an amount of power available in the current AUV and/or an amount of available memory in the current AUV. Further, the predetermined condition may be related to enough seismic signals being recorded for processing purposes, and/or enough seismic signals being recorded for quality checking seismic data, and/or a weather forecast (i.e., if one week of bad weather is forecasted, considering a one week time delay in replacing the AUVs). Thus, new AUVs 632 (new in the sense that their batteries are charged and/or memory emptied of previous data) are deployed from support vessel 630 or an underwater base to replace one or more of AUVs 602a that need such replacement. As noted above, this replacement or cycling can take place when vessel 642 is away from the AUVs or while the AUVs are actively recording seismic data originated by vessel 642.

Another scenario for which the cycling procedure discussed above is appropriate is when an in-fill mission is performed which lasts for days, e.g., about 10 days. For this embodiment, suppose that a conventional streamer survey is performed first and it lasts 10 days. After this, the AUVs are used to collect seismic data for in-fill reasons, i.e., to fill in the missing data from the seismic data recorded with the streamers. Such a mission may take a couple of days for cross-line orientated shooting lines and another couple of days for in-line orientated shooting lines. Thus, such an in-fill mission may last one or more weeks; during this time, some or all the AUVs deployed on the ocean bottom would eventually need to be replaced with new ones. However, note that a survey may take about 40 days and the AUVs may be cycled about three times during this time interval, resulting in an average of 10 days underwater deployment for each AUV.

Figure 7:
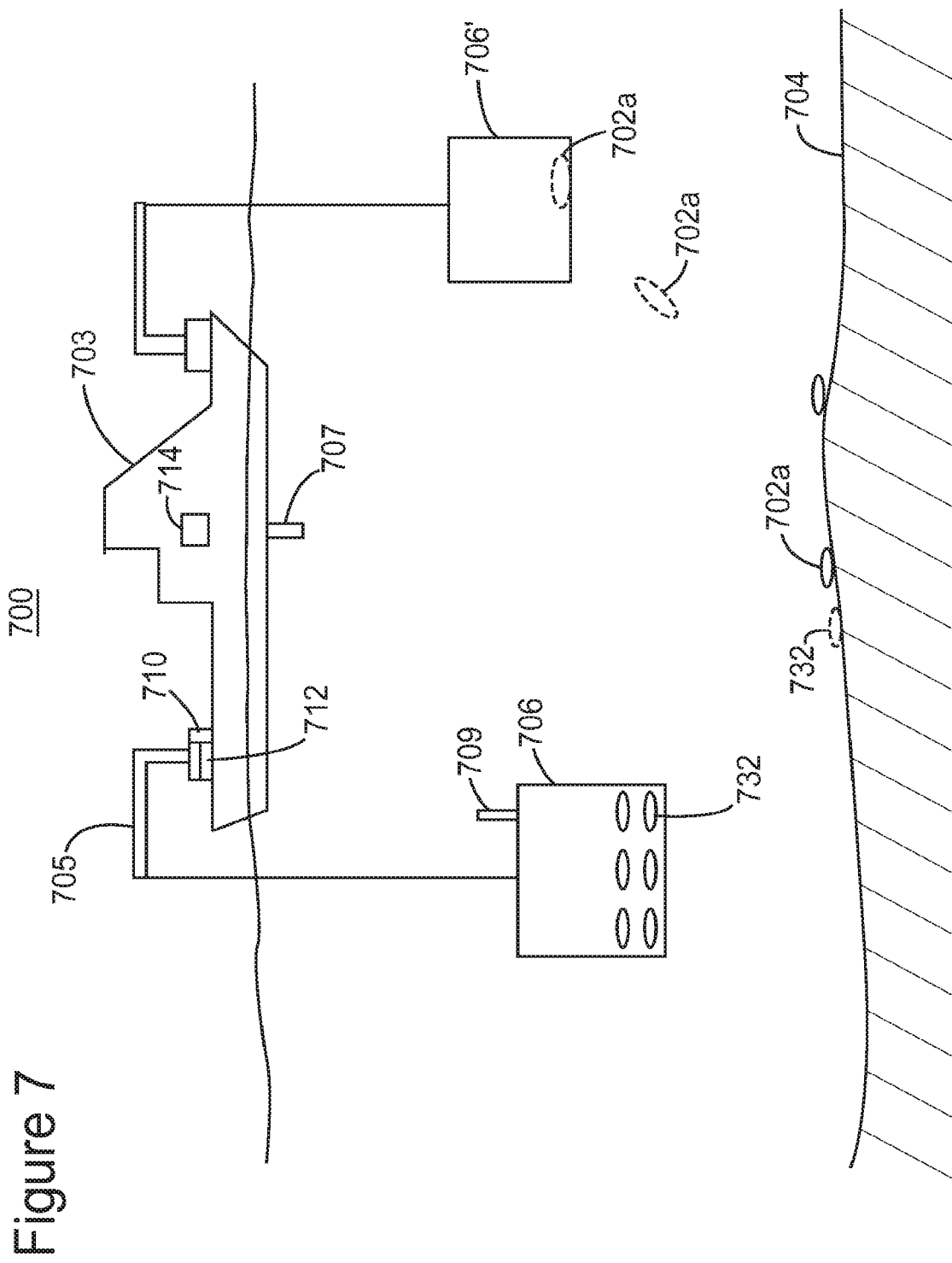
FIG. 7 is a schematic diagram of a deploying base and a recovery base connected to a support vessel according to an embodiment.

Next, various possible deployment methods of the above noted AUVs are discussed. FIG. 7 shows a seismic survey system 700 that includes a vessel 703 that, with the help of a crane 705, deploys an underwater base (e.g., a cage) 706 underwater and maintains the cage at a given underwater position described by coordinates (x,y,z). To achieve this condition, crane 705 may have a controller 710 that coordinates a heave mechanism 712 for maintaining given position (x,y,z) despite the normal movement of vessel 703. Note that given position (x,y,z) may be on or above the ocean bottom. In one application, controller 710 is part of a global controller 714 associated with the vessel's navigation system.

Underwater base 706 accommodates one or more AUVs 732 that are deployed when necessary to replace existing AUVs 702a already located on the ocean bottom 704. According to this embodiment, one or more AUVs 702a need to be replaced by AUVs 732, which have charged batteries. For this situation, the fully charged AUVs 732 are deployed from underwater base 706 after being instructed to land next to a corresponding AUV 702a needing a replacement. AUVs 702a's positions are known because either vessel 703 has used its detection system 707 (e.g., USBL) to determine those positions, or underwater base 706 has used a similar detection system 709, or AUVs 702a have calculated (e.g., using an INS system) their landing positions and have transmitted this information, e.g., using an acoustic modem, to underwater base 706 or vessel 703. Alternatively, the AUVs positions are known prior to deploying them because they have been pre-plotted.

Thus, AUVs 732 know where to land on the ocean bottom 704 after being launched from underwater node 706. After new AUVs 732 have landed on the ocean bottom 704 next to the AUVs 702a that need to be replaced, existing AUVs 702a detach from the ocean bottom and navigate toward underwater base 706 to be retrieved on the deck of vessel 703. If this cycling procedure is taking place during active seismic recording, there is no substantial gap in the recorded data, as the transfer from existing AUVs 702a to new AUVs 732 is achieved while recording the seismic data. However, a disadvantage of this procedure might be the noise introduced by those AUVs traveling toward the recording AUVs and/or the potential collisions between the existing AUVs and the new AUVs. Once the underwater base is full with old AUVs, crane 705 retrieves the base and the AUVs on the vessel's deck and a maintenance phase and/or data transfer phase occurs.

The embodiment discussed with regard to FIG. 7 may be modified to include two underwater bases, a launching base 706 and a recovery base 706'. With this configuration, launching base 706 launches new AUVs 732, and the old AUVs 702*a* do not return to launching base 706, but rather to recovery base 706'. Thus, it is possible to have the following three different scenarios:

(i) first launch new AUVs 732 and after they land on the ocean bottom, then recover existing AUVs 702*a*;

(ii) simultaneously launch AUVs 732 from base 706 and instruct AUVs 702*a* to go to recovery base 706'; this scenario is efficient but introduces gaps into the recorded data and it is prone to AUVs collision;

(iii) first instruct existing AUVs 702*a* to go to recovery base 706' and then instruct new AUVs 732 to land on the ocean bottom at the positions previously occupied by the existing AUVs 702*a*; under this scenario it may be possible to land the new AUVs very close to the previous positions of the old AUVs but may also introduce gaps into the recorded data.

Those skilled in the art would recognize that the above-discussed embodiments may be varied to achieve the same or similar results. For example, instead of a vessel holding both the deployment and recovery bases, two vessels may be used, each one holding one of the two bases. Alternatively, more than two bases may be used at the same time. Further, it is possible to land the bases on the ocean bottom or to leave them floating from a buoy. Furthermore, the two cranes illustrated in FIG. 7 may be placed at any location along the deck of the vessel, for example, both cranes at the back of the vessel. In one application, cages 706 and/or 706' are deployed on the ocean bottom and are not suspended in the water.

Figure 8:
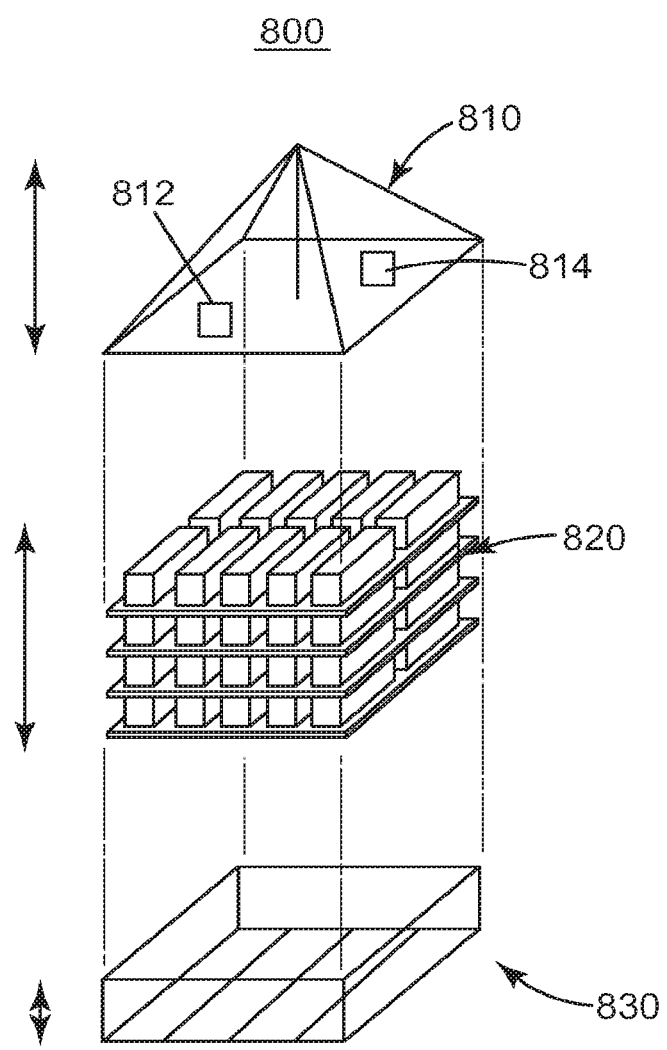
FIG. 8 is a schematic diagram of a deployment base according to an embodiment.

One possible configuration of the deployment base is now discussed. In one embodiment, as illustrated in FIG. 8, deployment base 800 may have a control part 810, a storing part 820 for storing the AUVs, and a support part 830. The three parts are attached to each other and serve the following purposes: control part 810 may include a control system 812 that coordinates the launching of the AUVs, and also provides beacon signals to the AUVs while traveling to their final destinations. Control part 810 may also include an acoustic device 814 for generating and transmitting the beacon signals as discussed later. Control part 810 may be attached above storing part 820 as illustrated in the figure. Other positions for the control part may be used. Storing part 820 is configured to hold a certain number of AUVs, for example, 20 or 40. Other numbers are possible as would be appreciated by those skilled in the art. For example, it is envisioned that storing part 820 may have dimensions in the order of meters, e.g., 3×3×5 m. Storing part 820 is attached above support part 830 and is configured to be flooded. Storing part 820 has a mechanism to lock the AUVs during operation of the crane, and is configured to provide a communication interface with the AUVs and the control part.

Support part 830 may be a strong structure designed to support the weight of the control part and the storing part. Also, the support part is designed in such a way that avoids the burial of the deployment base into the ocean bottom. However, the support part is also designed to partially burry into the ocean bottom to stabilize the storing part as this part needs to be immobile to achieve the desired acoustic guidance performance.

Figure 9:
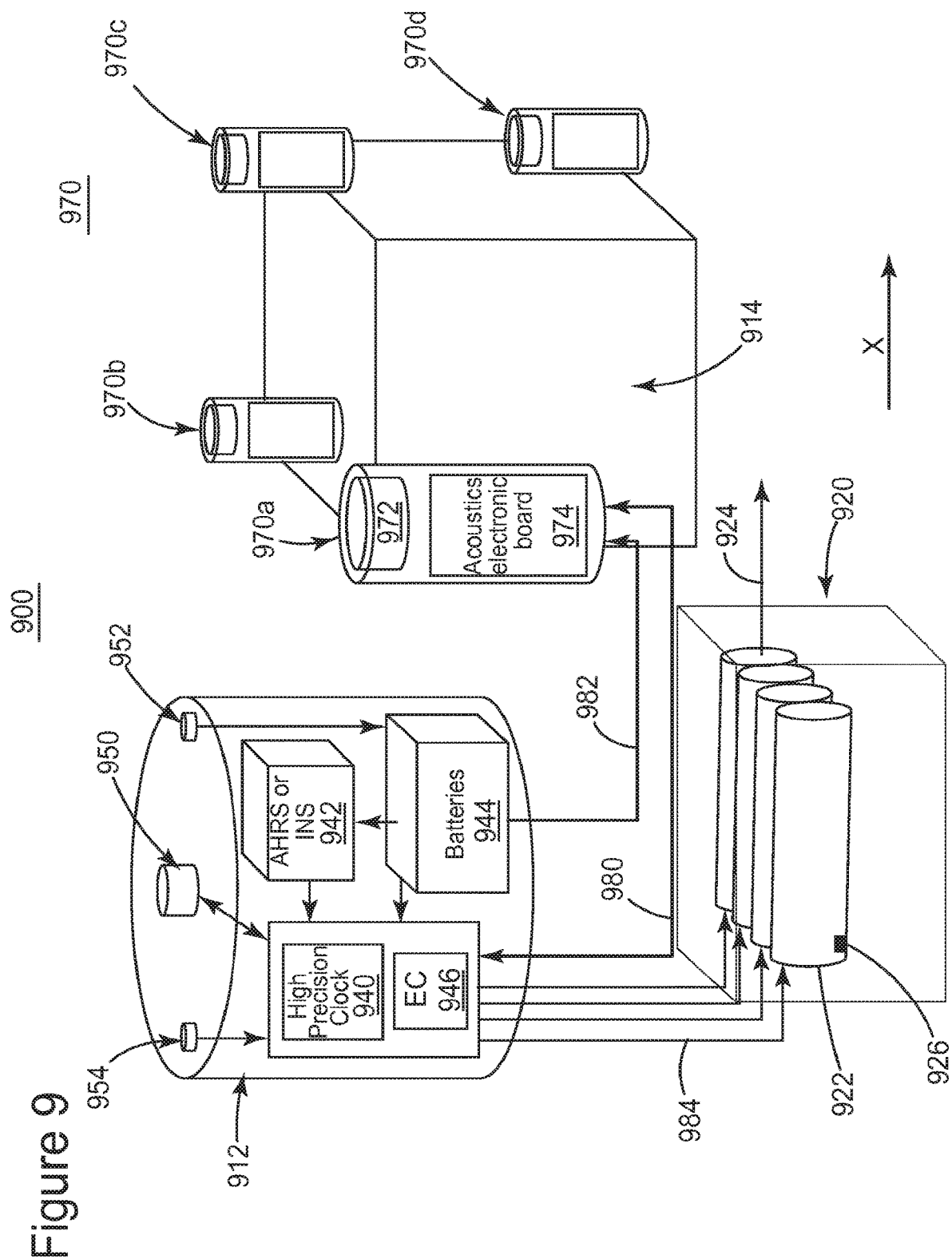
FIG. 9 is a schematic diagram of a control part of a deployment base according to an embodiment.

A schematic representation of the functional units of a deployment base 900 is illustrated in FIG. 9. Deployment base 900 includes, as discussed above with reference to FIG. 8, a control system 912 and an acoustic system 914. Control system 912 is functionally connected to the storing part 920, as now discussed. Control system 912 may include a variety of elements, some of them illustrated in FIG. 9. A clock 940 (which may be a high-precision clock) is connected to a navigation device 942, and both the clock 940 and the navigation device 942 are connected to a power source 944 (e.g., a battery). Various other electronic components 946 may also be provided in the control system, for example, to interface with storing part 920 and acoustic system 914.

Navigation device 942 may include an inertial navigation system (see, e.g., INS 218), an attitude and heading reference system (AHRS), or another similar device. Navigation device 942 is used for determining an accurate position and orientation of the underwater base. For example, when crane 705, illustrated in FIG. 7, deploys underwater base 706/900 on the ocean bottom, the underwater base freely rotates while being moved from the vessel to the ocean bottom and also can change its X and Y coordinates (if the X and Y coordinates describe the ocean surface and the Z coordinate describes the depth). However, for guiding the new AUVs to their new positions and for being able to recover the existing AUVs, the underwater base needs to know, as accurately as possible, its own absolute position. By knowing the original coordinates (i.e., when the underwater base is released into the water, the vessel's GPS is used to determine this position) of the underwater node and its trajectory (using the INS or AHRS) while traveling underwater toward the ocean bottom, the underwater base is capable of calculating its final x,y,z position on the ocean bottom, and also its orientation, e.g., an angle between (i) a longitudinal axis 924 of a launching tube 922 that is used by the storing part to launch the new AUVs and (ii) a reference axis or system of axes (e.g., x). Launching tube 922 may include a locking mechanism 926 for locking a corresponding AUV during a transition of the underwater base from the vessel to the ocean bottom.

The x,y,z position and its orientation may also be determined by an acoustic device installed on the vessel, for example, USBL, and this information may be transmitted to the underwater base via an acoustic modem. For the purpose of exchanging this and other information (e.g., status of deployment/recovery, etc.) with the vessel while underwater, the underwater node also has a modem port 950. A power port 952 is provided for charging the power unit 944 when the underwater node is on the vessel's deck, or for connecting to an underwater device that has the capability to provide power. Control system 912 may also have a port 954 for synchronizing, when on the vessel's deck, clock 940, downloading mission parameters, uploading data acquired during launch and recovery, etc. Alternatively or in addition, a physical connection (cable) may be provided between the underwater base and the vessel.

Deployment base 900 also includes an acoustic system 914 for providing guidance to departing and/or arriving AUVs. Acoustic system 914 may include three or more acoustic beacons 970*a-d* (although FIG. 9 shows four acoustic beacons, an underwater base having only three acoustic beacons is also possible) located, for example, on control part 810 illustrated in FIG. 8. Thus, these acoustic beacons may form a short base line (SBL) system 970. Other locations of the acoustic beacons on the underwater base are possible. Having more acoustic beacons is desirable so that during a seismic survey, each AUV has a "direct view" of at least three acoustic beacons for positioning itself. In one application, at least two of the acoustic beacons are positioned within a base of a pyramid, while at least one of the acoustic beacons is positioned at the top of the pyramid. In this arrangement, each AUV has the capability to position itself in not only a horizontal, but also in a vertical plane relative to the ocean bottom.

An acoustic beacon may include a ceramic element 972 that emits the acoustic signal and corresponding electronics 974 that interacts with the control system 912 and also controls the ceramic element. FIG. 9 illustrates an electric link 980 between the control system 912 and acoustic beacons 970*a-d*, and also an electric link 982 between battery unit 944 and acoustic beacons 970*a-d*. FIG. 9 also illustrates a link 984 between control system 912 and launching tubes 922 of storing part 920. This link 984 may be a wired or wireless link.

In one application, a distance between two acoustic beacons may be in the order of meters, for example, 2.5 m. With such a configuration, it is expected that an AUV could detect its position from 1 km away, with a good precision, e.g., 1 m. As the technology improves, it is expected that these numbers will become even better. Control system 912 is programmed to select appropriate frequency channels for the acoustic beacons, to adjust the channels if necessary, to synchronize the acoustic beacons, and to exchange information with the acoustic beacons, e.g., to send commands to interrogate the AUVs. In one application, control system 912 is capable of interrogating the AUVs about their position and their status, instructing them to return to the underwater base, etc. Thus, acoustic system 914 may provide not only AUVs guidance functionality, but also AUVs communication, wired or wireless.

Figure 10:
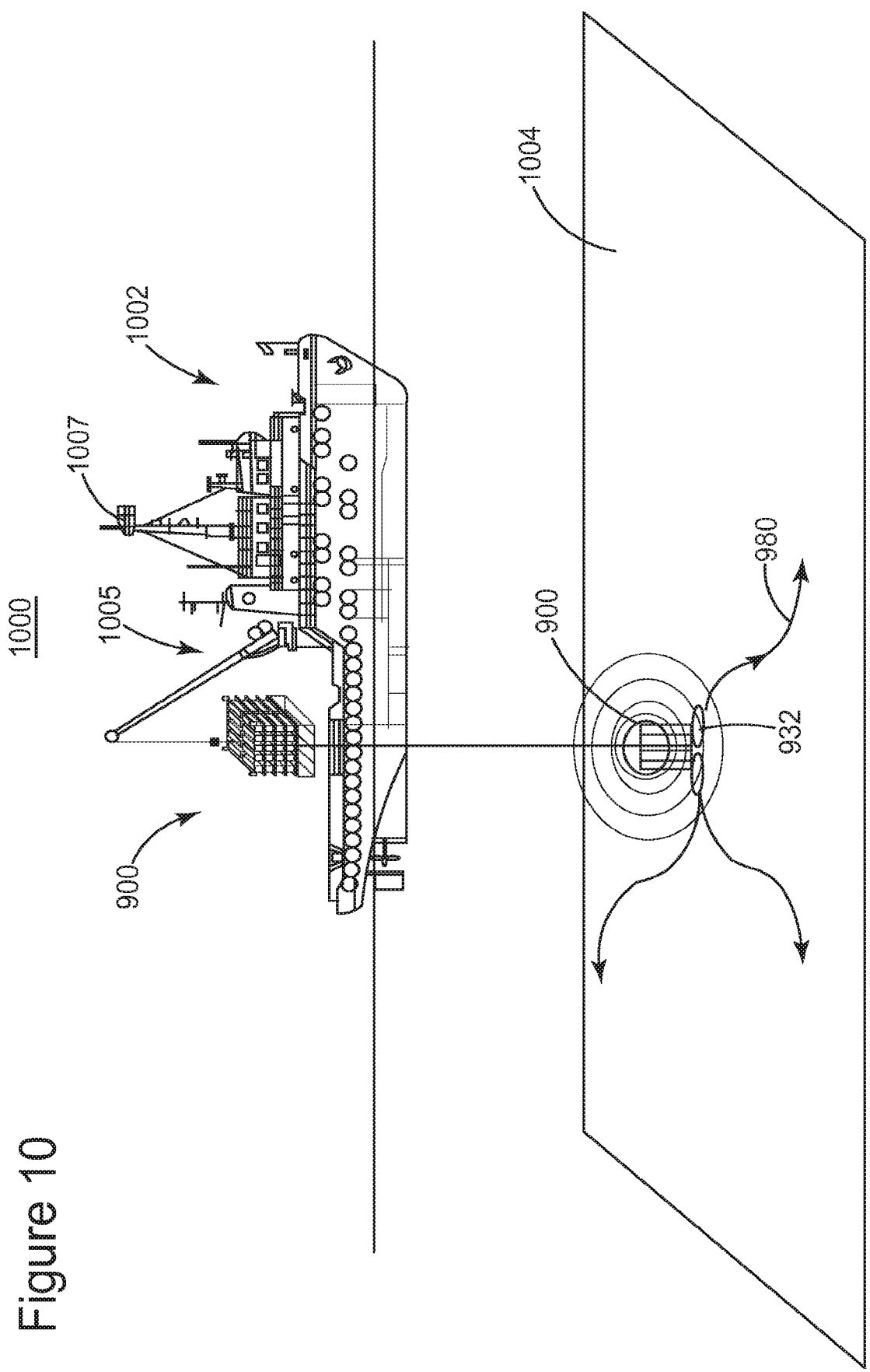
FIG. 10 is a schematic diagram of a seismic system that uses underwater bases for handling AUVs according to an embodiment.
Figure 11:
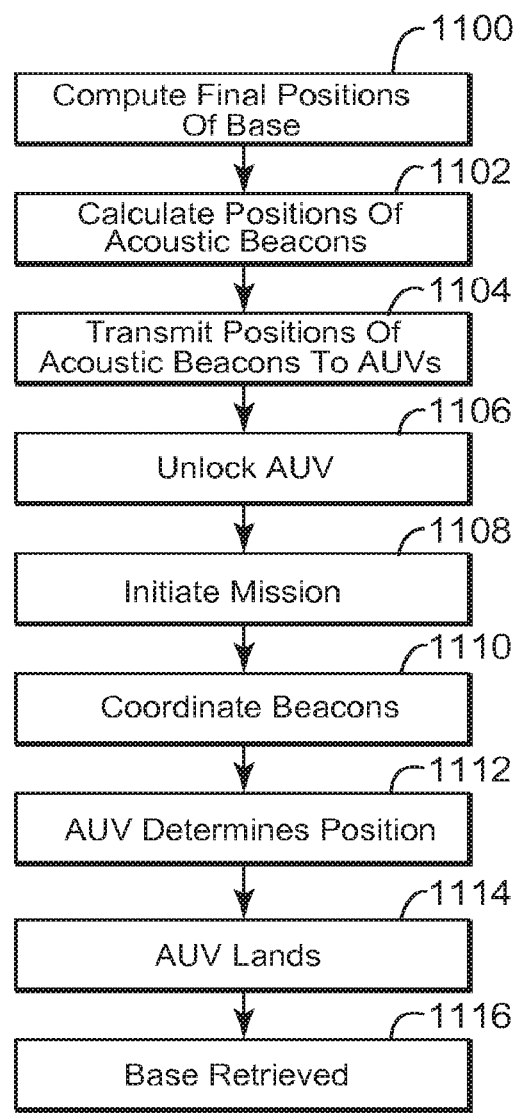
FIG. 11 is a flowchart of a method for deploying AUVs from a deployment base according to an embodiment.

An entire sequence for deploying the underwater base and launching the corresponding AUVs is now discussed with reference to FIGS. 10 and 11. FIG. 10 illustrates a seismic survey system 1000 including a vessel 1002 and at least one underwater base 900. Note that vessel 1002 may carry any number of underwater bases 900. A heave compensated crane 1005, similar to that described in the embodiment illustrated in FIG. 7, may handle underwater base 900. From its initial position on the deck (which position may be calculated by the GPS 1007 of the vessel), as illustrated in step 1100 of FIG. 11, underwater base 900 computes its final position on the ocean bottom 1004. The computing step relies not only on the base's initial position when launched in water, but also on the AHRS or INS system's output for determining the entire trajectory of the underwater base, from the vessel until it lands on the ocean bottom. The result of the computation step is an accurate final position (x,y,z) on the ocean bottom and an orientation of the base relative to, for example, longitudinal axis 924 of the launching tubes (see FIG. 9). This position may also be calculated by the USBL of the vessel and then transmitted through an acoustic modem or a wire to the underwater base. In step 1102, the underwater base calculates the absolute position of each beacon, based on the known geometry of the SBL (i.e., the locations of the acoustic beacons) and the final position of the underwater base calculated in step 1100. The beacons' positions are transmitted in step 1104 to the AUVs 932 that are stored in the storing part of the underwater base. This communication may be wireless or wired.

In step 1106, the control system instructs the locking mechanism to release the corresponding AUV and in step 1108 the AUV is instructed, by the control system, to start its mission. At the same time, control system coordinates in step 1110 the acoustic beacons to send the correct acoustic signals so that the launched AUV can determine its position relative to the underwater base and/or ocean floor. This position determination happens in step 1112, while the AUV 932 travels from underwater base 900 to target position 980. The position determination involves the AUV's processor in calculating distances to at least three acoustic beacons and, based, for example, on triangulation, determining its absolute position relative to target position 980. This step may be repeated until the AUV reaches its target position. Once at the target position, AUV lands on the ocean bottom in step 1114 and, optionally, may use a drilling device to attach (connect) to the ocean floor. Then, AUV starts recording seismic data. The recording step may be triggered by the underwater base, the vessel, or an internal mechanism of the AUV.

The underwater base may use its iSBL or USBL system to compute the final position of AUVs. This data may be stored for later use or transmitted to the vessel. If this embodiment uses a deployment base and a recovery base, after the last AUV has been launched from the deployment base, the deployment base is retrieved in step 1116 back on vessel 1002, to be prepared for another mission.

Figure 12:
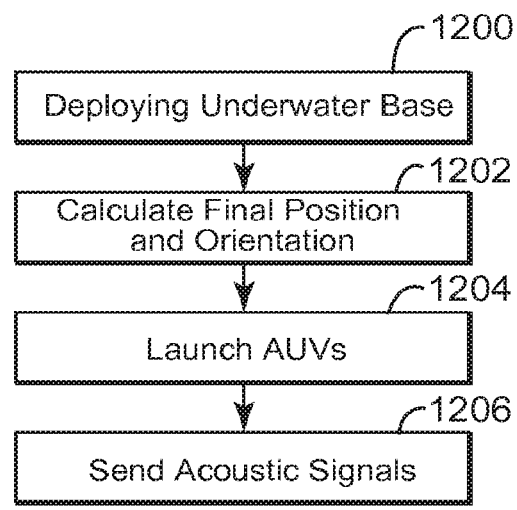
FIG. 12 is a flowchart of a method for guiding AUVs from a deployment base to a desired target position according to an embodiment.

A method for deploying AUVs underwater at desired target positions is now discussed with regard to FIG. 12. FIG. 12 includes a step 1200 of deploying an underwater base to the ocean bottom. The underwater base includes plural AUVs that need to be deployed at the desired positions. In step 1202 the underwater base calculates its final position and orientation and transmits these results to the AUVs stored in the underwater base. The AUVs also store their target positions. In step 1204 the AUVs are launched, sequentially or simultaneously, and in step 1206 acoustic signals emitted by acoustic beacons of the underwater base are sent to the AUVs for determining their absolute positions. The AUVs know the exact locations of the acoustic beacons (this information was received by each AUV prior to departing the underwater base) and by triangulating the acoustic beacons, the AUVs are able to determine their absolute positions, relative to the ocean bottom. As described in previous embodiments, the AUVs are capable of adjusting their trajectories, based on the calculated absolute positions, to arrive at the target positions.

Before, while, or after the newly released AUVs have traveled to their final destination, the existing AUVs are instructed, in one embodiment, to return to a recovery base, e.g., recovery base 706', as discussed with regard to FIG. 7. The recovery base is now discussed in more detail with regard to FIGS. 13A and 13B.

Recovery base 1300 may include a control part 1310, an inlet part 1320, a storing part 1330, and a support part 1340 configured to support the control part, the inlet part, and the storing part, and also to prevent a burial of the recovery base. However, support part 1340 may be also designed to partially bury into the ocean bottom to make the rest of the base immobile. Similar to the deployment base, the recovery base may handle the AUVs simultaneously or sequentially. The recovery base may be attached to a heave compensated crane as in FIG. 7, or it may be released on the ocean bottom and then be recovered by using, for example, a floating buoy. Control part 1310 may include a control system 1312 and an acoustic system 1314. While the control system and acoustic system of recovery base may be similar to those described in FIG. 9, the inlet part 1320 and storing part 1330 are different.

Figure 14:
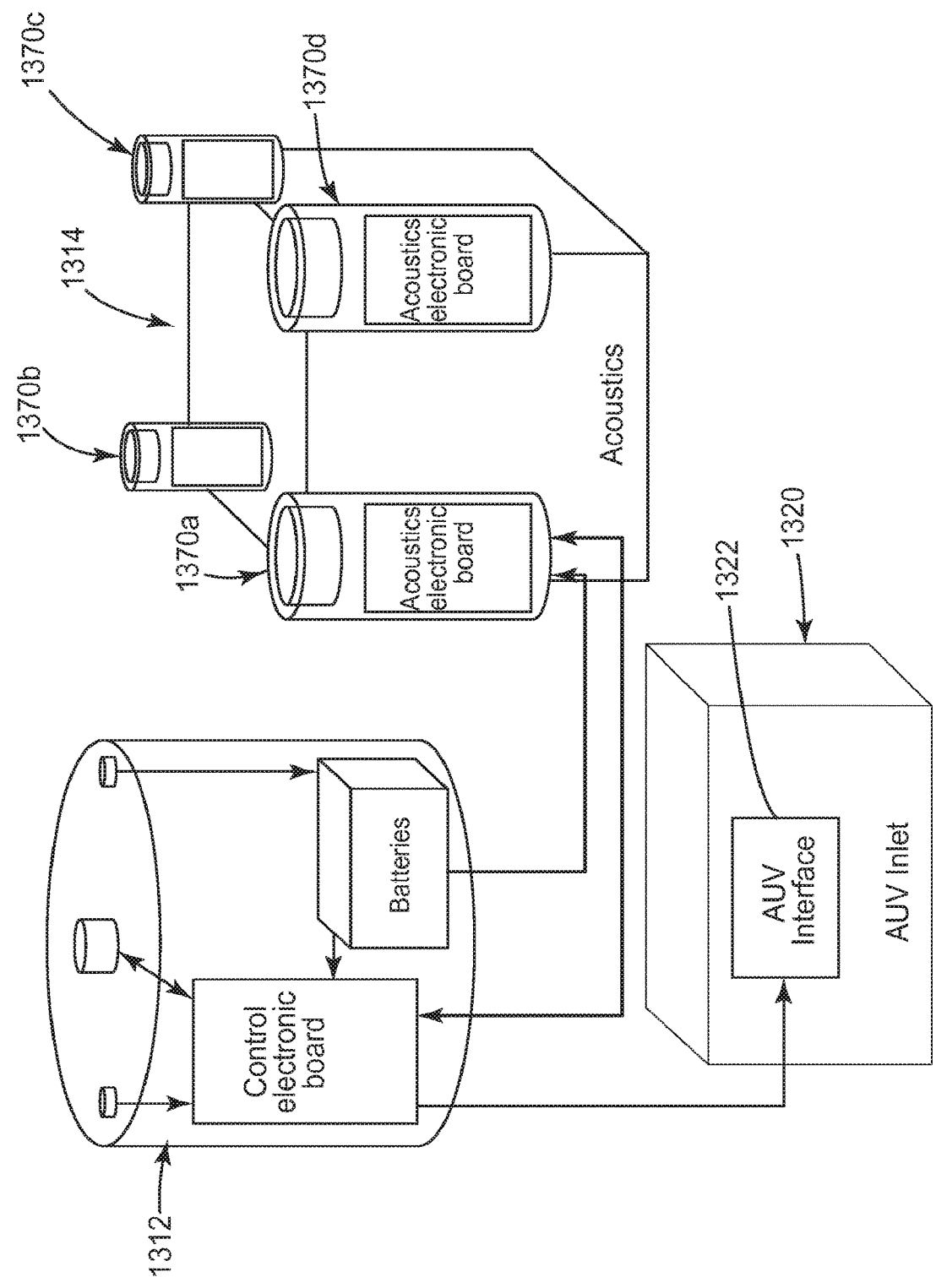
FIG. 14 is a schematic diagram of a control part of a recovery base according to an embodiment.
Figure 15:
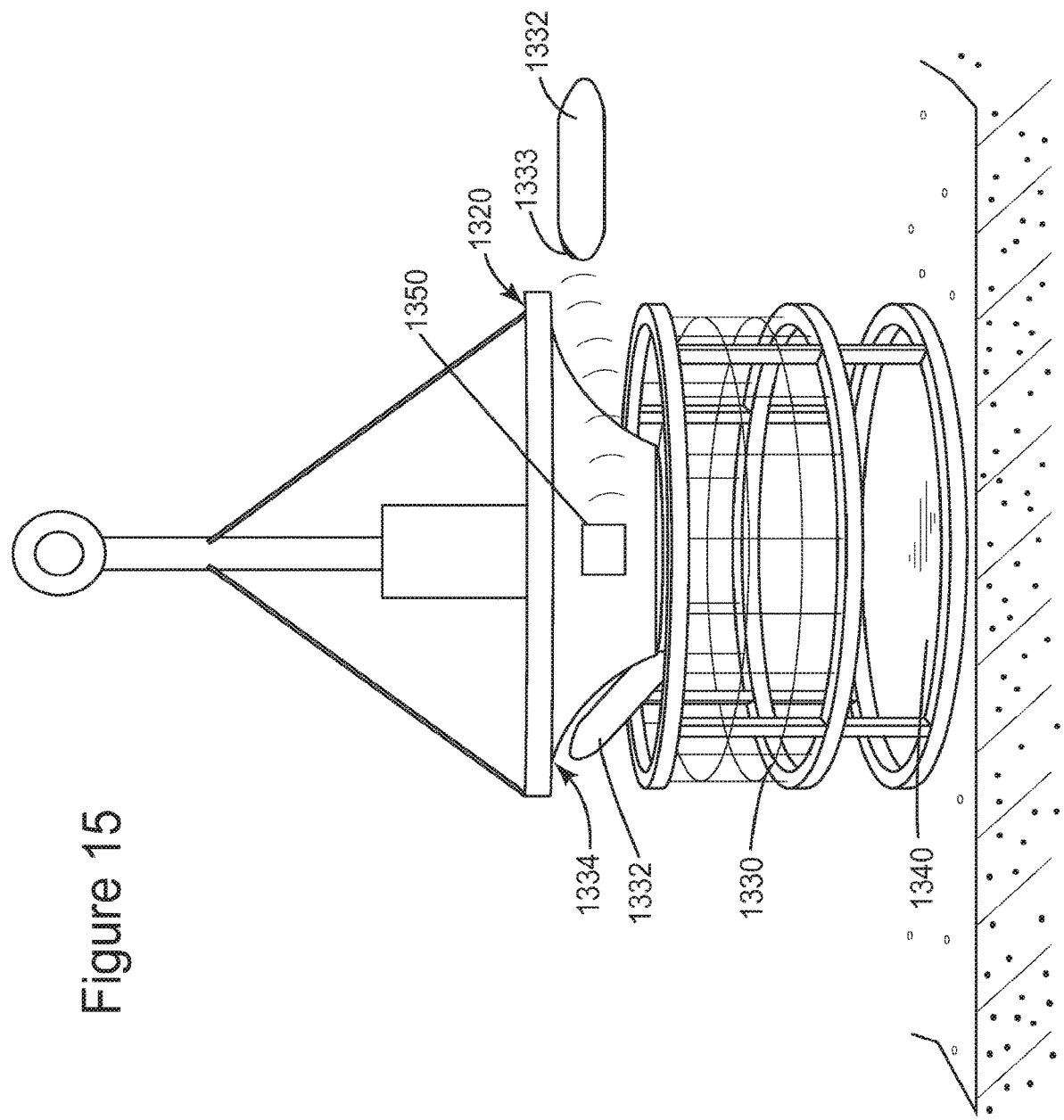
FIG. 15 is a schematic diagram of an inlet part of a recovery base according to an embodiment.

With regard to the inlet part 1320, the functionality includes detecting that an AUV has entered the recovery base and also instructing AUVs to switch off their propulsion systems. In this way, after an AUV enters through the inlet part 1320 (which is the gate to the storing part 1330), the AUV simply falls into the storing part 1330 as its propulsion system is shut down. This is advantageous for conserving the energy left in its battery and also for preventing the AUV from escaping the storing part. For these purposes, as illustrated in FIGS. 13B and 14, the inlet part 1320 may have an AUV interface 1322 that is configured to detect the entrance of an AUV and also to identify the AUV. In one application, each AUV has a unique identification ID which may be detected by the AUV interface 1322. For example, AUV interface 1322 includes an acoustic modem that interrogates the AUV about its ID. After the ID is checked against, for example, a table stored in the memory of the control system 1312, AUV interface 1322 instructs the AUV to shut down its propulsion system. In one embodiment, the instruction to shut down the propulsion system is sent after a predetermined amount of time to make sure that the AUV has entered the storing part. The storing part 1330 may be simply a chamber for receiving the recovered AUV. In one application, inlet part 1320 has an inclined surface 1324, as illustrated in FIG. 15, for deviating AUVs 1332 into the storing part.

Acoustic system 1314 may be different than the one shown in FIG. 9. Thus, for this embodiment, acoustic system 1314 may include, as shown in FIG. 15, a transducer (e.g., pinger) 1350 located in the center of the inlet part and configured to emit a signal. The AUV 1332 then uses its USBL system 1333 to detect the emitted signal and to approach the inlet part 1320. Acoustic system 1314 may also include one or more acoustic beacons with a configuration that allows the AUV to find a height of the inlet part. The acoustic beacons may be those shown in FIG. 14 or others. Control system 1312 is configured to control the transducer and one or more acoustic beacons to coordinate the recovery of the AUVs. With this configuration, once deployed on the ocean bottom, the recovery base sends an acoustic wake-up message to the AUVs that need to be recovered. The recovery base then activates its acoustic system to allow the AUVs to position themselves, regarding the inlet part and find the inlet part. The control system ensures that the beacons emit the required signals at the required instants. Knowing the direction of the inlet part, the AUVs navigate to enter the recovery base. Upon entering the inlet part, each AUV triggers the AUV interface and stops its mission.

Figure 16:
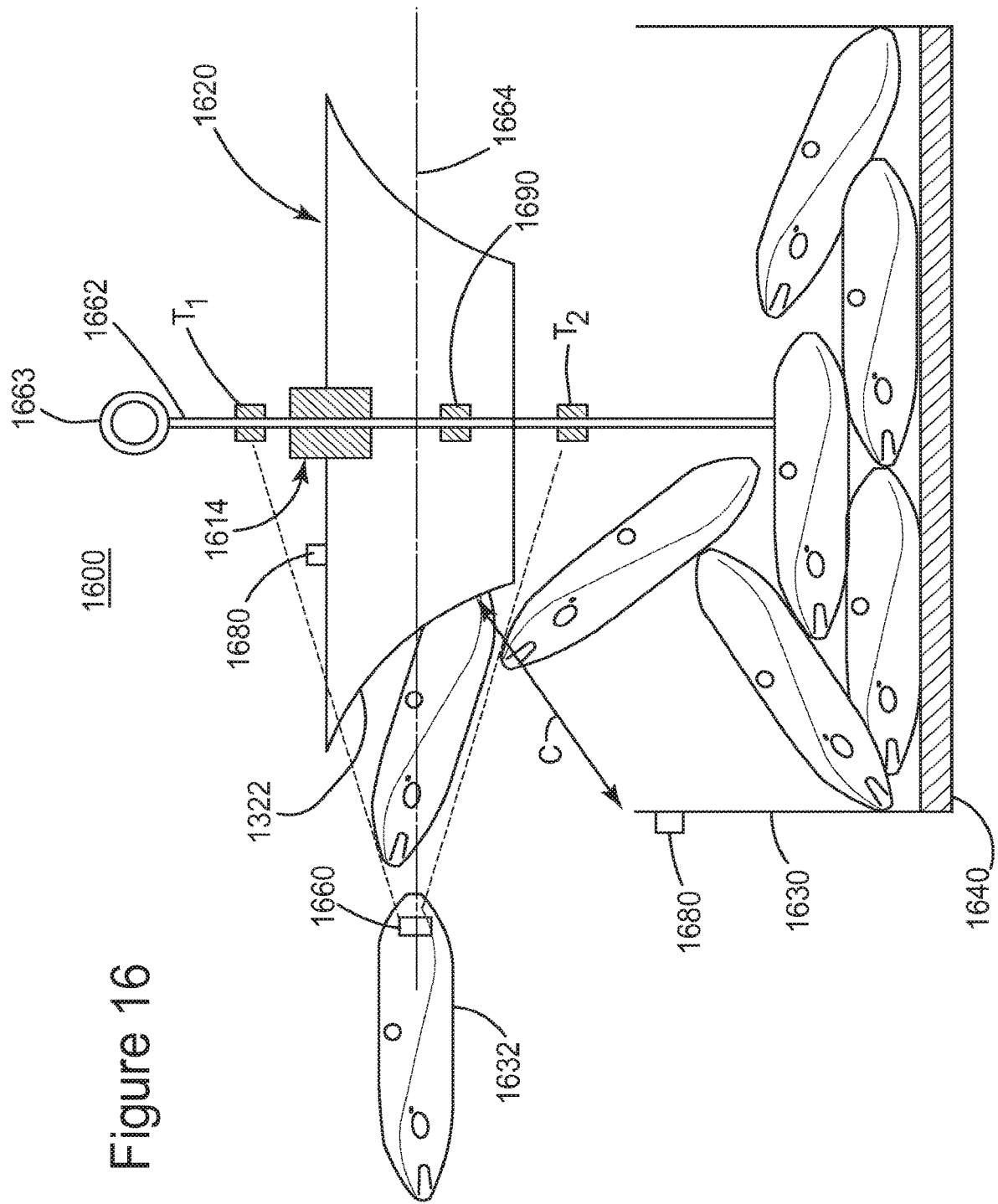
FIG. 16 is another schematic diagram of the inlet part of the recovery base according to an embodiment.
Figure 17:
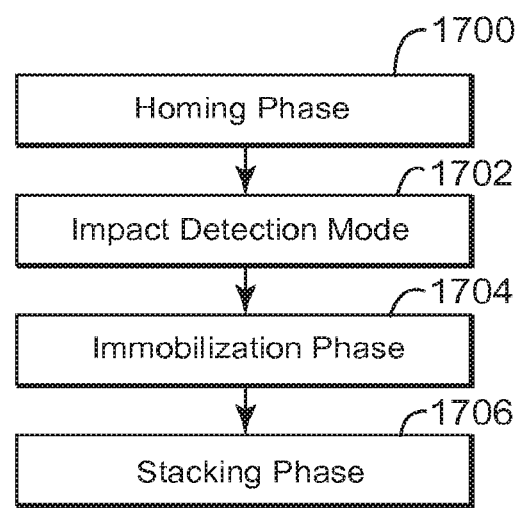
FIG. 17 is a flowchart of a method for recovering AUVs according to an embodiment.

According to another embodiment illustrated in FIG. 16, acoustic system 1614 includes at least two transducers T1 and T2. Transducer T1 may be used to send a (unique) signal to wake-up AUV 1632 or a set of AUVs that form a group. This unique signal is recognized by a single AUV and not by the others or by the group and not by other groups. AUV 1632 takes off from its location on the ocean bottom and enters a homing phase in step 1700 as illustrated in FIG. 17. AUV 1632, while navigating in the volume of water, it is attracted to the center of the inlet part 1620 by the acoustic system 1614. This system may operate in a frequency range between 20 and 30 kHz.

The two transducers Ti and T2 are synchronized to transmit, for example, a 10 ms pulse every second (with a transmission from transducer T2 shifted from 100 ms in time from a transmission from transducer T1) and they are located on a center pole 1662 of the mechanical frame of the recovery base. The two transducers T1 and T2 are, in one embodiment, equidistantly located (e.g., 3 m) from the "recovery navigation plane" 1664 that AUV 1632 follows during the homing phase. Central pole 1662 may extend throughout the storing part. In one application, the central pole extends outside the recovery base and ends up with a hook 1663 that connects to a crane. In still another application, the central pole does not enter the storing part, but the second transducer T2 is placed inside the storing part, symmetrically located from transducer T1 relative to the recovery navigation plane. The recovery navigation plane 1664 is designed to extend, for example, substantially perpendicular on the center pole 1662. In one application, the recovery navigation plane intersects inlet part 1620 as illustrated in FIG. 16. In still another application, the recovery navigation plane is designed to extend between inlet part 1620 and storing part 1630. In still another application, inlet part 1320/1620 has an actuation mechanism 1690, controlled for example by the control system 1312, and configured to lower and raise the inlet part. For example, while the recovery base is traveling from the vessel to the ocean bottom, or the other way around, actuation mechanism 1690 closes the gap between inlet part 1620 and storing part 1630 so that no AUV escapes. However, when the recovery underwater base lands on the ocean bottom, actuation mechanism 1690 raises the inlet part 1620 to provide enough clearance C for the AUV to enter the storing part. In one embodiment, clearance C is equal to or larger than a height of the AUV.

The phased receiving array 1660 located on AUV 1632, e.g., on its nose, may include at least three hydrophones that are configured to capture the signals emitted by transducers T1 and T2. Processing capabilities of the AUV, e.g., its processor and accompanying software, are configured to calculate the direction and/or distance to the center pole 1662 and the navigation attitude, relative to the recovery navigation plane 1664.

Following the recovery navigation plane 1664, AUV 1632 eventually hits the AUV sensitive deflector 1322 and falls into storing part 1630. AUV 1632 may be programmed to switch in step 1702 from the homing phase to the impact-detecting mode. To achieve this, the AUV's processor may be configured to compare an estimated distance to the center pole 1662 or another reference point with a predetermined distance, e.g., 5 m, and when the estimated distance is smaller than the predetermined distance, to automatically switch from the homing phase to the impact detection mode. During the impact detection mode, the AUV may be configured to reduce its speed to a certain percentage of the normal speed, allowing it more time to react and change its course, if necessary, and also to hit the AUV interface 1322 with less force.

If located on the upper part of the AUV, the phased receiving array 1660 will directly hit the AUV interface 1322 and the impact detection mode will make the AUV's processor detect the impact shock, which is characterized by high energy and a larger frequency bandwidth. In one application, any part of the AUV may hit the AUV interface 1322 and make the AUV's processor detect the impact shock. When the impact shock is detected in step 1702, the AUV's processor instructs the thrusters and/or jet pumps to stop in step 1704, resulting in a slow dive of the AUV down into the storing part, as the AUV is negatively buoyant.

The sensitive AUV interface 1322 may be configured to also detect the impact, because, in one embodiment, the AUV interface is made of one or several quadrants of piezoelectric fabric material, such as piezoelectric polyvinylidene fluoride (PVDF), all of them connect to the acoustic system 1614. Thus, the acoustic system may condition and process the PVDF generated impact signals and inform the control system of the recovery base accordingly. In one application, the control system may communicate this info to the respective AUV to offer a redundancy mechanism for making sure that the AUV enters the immobilization phase in step 1704. In step 1706, the AUVs are stacked in the storing part and then the entire recovery base is brought back on the vessel.

The operational model discussed with regard to FIG. 17 is designed such that not all AUVs arrive at the same time at the inlet part. In other words, it is expected that a single AUV hits the AUV interface at any instant. Thus, the control system knows the number of recovered AUVs and can send a status report to the support vessel using its embedded modem.

In one application, recovery base may have one or more cameras 1680 so that visual information of the stack of AUVs captured inside the storing part can also be transmitted via modem to the support vessel. Once the desired AUVs have been recovered, the recovery base is lifted back to the support vessel.

Figure 18:
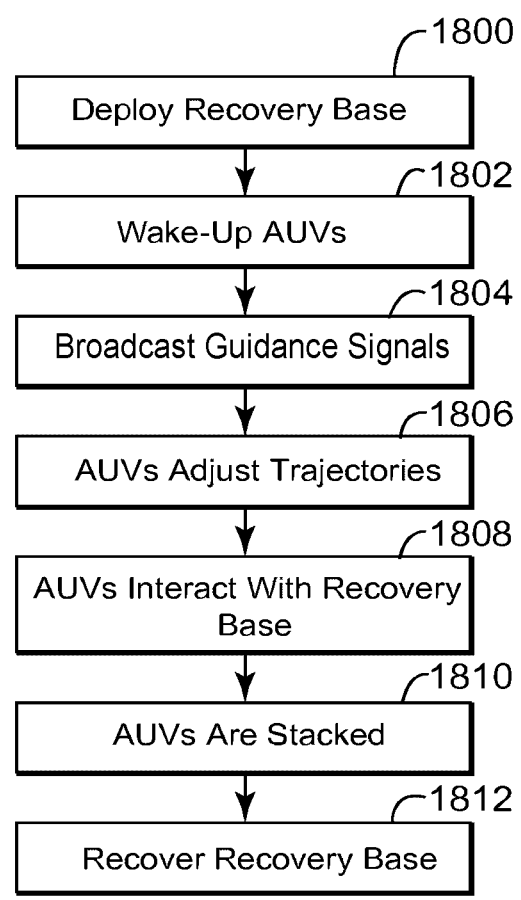
FIG. 18 is a flowchart of a method for deploying a recovery base and recovering AUVs according to an embodiment.

A method for recovering AUVs from the ocean bottom is now discussed with regard to FIG. 18. In step 1800, an empty recovery base is deployed on the ocean bottom. Once on the ocean bottom, the acoustic system is activated to wake up the desired AUVs in step 1802 and to broadcast guidance signals for those AUVs in step 1804. Those AUVs that were woken up start to navigate towards the recovery base and adjust their trajectories in step 1806 based on received signals that are indicative of a recovery navigation plane. The recovery navigation plane is defined by the physical arrangement of the sensors forming the acoustic system. In step 1808, the AUVs interact with an AUV interface of the recovery base, and as a result of this interaction, the AUVs are instructed to switch off their propulsion system and fall into a storing part of the base. Thus, the AUVs are stacked in step 1820 in the storing part. In one application, the recovery base identifies the AUVs entering the storing part. In step 1812, the recovery base is brought back on the vessel for recovering the seismic data from the AUVs and for replacing or recharging their batteries. The above noted steps may be performed in the order illustrated in FIG. 18 or in another order that is consistent with the description of the other embodiments. Also, these steps may be modified, reduced or enlarged based on the discussed embodiments as will be appreciated by those skilled in the art.

One or more of the exemplary embodiments discussed above disclose a deployment base, a recovery base, and methods for deploying, recovering, and cycling or rolling AUVs during or after a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system for the deployment or retrieval of seismic nodes on or near the seabed, comprising
    an underwater base coupled to a surface vessel, wherein the underwater base stores a plurality of autonomous underwater vehicles (AUVs), wherein each of the AUVs comprises one or more seismic sensors and a propulsion system,
    wherein the underwater base is configured to be lowered and raised from the surface vessel to a subsea position with the plurality of AUVs; and
    wherein the underwater base comprises a control system for launching one or more of the plurality of AUVs from the underwater base.

2. The system of claim 1, wherein the underwater base acts both as a launching base and a recovery base.

3. The system of claim 1, wherein the underwater base comprises an inlet part for receiving the plurality of AUVs and a storing part for storing the plurality of AUVs.

4. The system of claim 3, wherein the inlet part is configured to detect and identify an AUV during entrance into the underwater base.

5. The system of claim 3, wherein the storing part comprises a chamber.

6. The system of claim 3, wherein the plurality of AUVs are stacked in the storing part.

7. The system of claim 1, wherein the underwater base comprises one or more stacks for storing the plurality of AUVs.

8. A method for the deployment of a plurality of seismic nodes on or near the seabed, comprising
    storing a first plurality of autonomous underwater vehicles (AUVs) in an underwater base, wherein each AUV comprises one or more seismic sensors and a propulsion system;
    lowering the underwater base from a surface vessel to a subsea location;
    launching the first plurality of AUVs from the underwater base while the underwater base is coupled to the surface vessel; and
    deploying each of the first plurality of AUVs at a position on the seabed.

9. The method of claim 8, wherein the launching step is based on communications from the underwater base.

10. The method of claim 8, further comprising guiding the first plurality of AUVs to one or more seabed locations based on communications provided by the underwater base.

11. The method of claim 8, further comprising unlocking the first plurality of AUVs prior to launching them from the underwater base.

12. The method of claim 8, further comprising maintaining with a heave compensated crane the underwater base during deployment of the first plurality of AUVs.

13. The method of claim 8, wherein the launching step is performed sequentially for each of the first plurality of AUVs.

14. The method of claim 8, further comprising:
    lifting the underwater base to the surface vessel;
    storing a second plurality of AUVs in the underwater base;
    lowering the underwater base to a subsea position; and
    launching the second plurality of AUVs from the underwater base.

15. A method for the retrieval of a plurality of seismic nodes on or near the seabed, comprising
    deploying an underwater base from a surface vessel to a subsea location;

recovering a plurality of autonomous underwater vehicles (AUVs) into the underwater base while the underwater base is coupled to the surface vessel, wherein each AUV comprises one or more seismic sensors and a propulsion system; and lifting the underwater base from the subsea location to the surface vessel with the plurality of AUVs.

16. The method of claim 15, further comprising guiding the plurality of AUVs to the underwater base based on communications provided by the underwater base.

17. The method of claim 15, further comprising storing the plurality of AUVs in one or more stacks in the underwater base.

18. The method of claim 15, further comprising detecting and identifying each of the plurality of AUVs as the AUV enters the underwater base.

19. The method of claim 15, further comprising instructing each of the plurality of AUVs to turn off its propulsion system as the AUV enters the underwater base.

20. The method of claim 15, wherein the recovery step is performed sequentially for each of the plurality of AUVs.

* * * * *